United States Patent [19]

Takamatsu

[11] Patent Number: 4,638,386
[45] Date of Patent: Jan. 20, 1987

[54] OPERATION CHANGING MECHANISM RESPONSIVE TO DIRECTION CHANGE OF A REVERSIBLE MOTOR

[75] Inventor: Ryoji Takamatsu, Yokohama, Japan

[73] Assignee: Sony Corporation, Tokyo, Japan

[21] Appl. No.: 506,664

[22] Filed: Jun. 22, 1983

[30] Foreign Application Priority Data

Jun. 23, 1982 [JP] Japan ................. 57-108143

[51] Int. Cl.$^4$ ............... G11B 5/008; G11B 15/00; G11B 17/00; G03B 1/04
[52] U.S. Cl. ...................... 360/96.5; 360/90; 360/137; 360/96.6; 360/96.2; 242/198
[58] Field of Search ............ 360/96.5, 96.1, 96.2, 360/96.3, 96.4, 96.6, 137, 90, 74.1–74.5; 242/198, 199

[56] References Cited

U.S. PATENT DOCUMENTS

| | | | |
|---|---|---|---|
| 4,225,894 | 9/1980 | Fukukawa et al. | 360/137 |
| 4,238,808 | 12/1980 | Tomita | 360/96.5 |
| 4,313,142 | 1/1982 | Uchida | 360/105 |
| 4,374,401 | 2/1983 | Takai | 360/96.5 |
| 4,422,114 | 12/1983 | Sugihara | 360/90 |
| 4,470,087 | 9/1984 | Sakamoto et al. | 360/96.2 |
| 4,504,877 | 3/1985 | Tsuchiya | 360/96.5 |
| 4,507,694 | 3/1985 | Hosono et al. | 360/90 |
| 4,547,823 | 10/1985 | Ri et al. | 360/90 |

FOREIGN PATENT DOCUMENTS

| | | | |
|---|---|---|---|
| 53-83713 | 7/1978 | Japan | 360/96.3 |
| 57-141073 | 9/1982 | Japan | 360/96.5 |
| 58-26360 | 2/1983 | Japan | 360/96.6 |
| 58-45642 | 3/1983 | Japan | 360/96.5 |
| 59-60751 | 4/1984 | Japan | 360/96.5 |
| 1551986 | 9/1979 | United Kingdom | 30/96.5 |
| 2125608 | 3/1984 | United Kingdom | 360/96.5 |

Primary Examiner—John H. Wolff
Assistant Examiner—Alfonso Garcia
Attorney, Agent, or Firm—Lewis H. Eslinger; Alvin Sinderbrand

[57] ABSTRACT

An operation changing mechanism for a tape recording-/reproducing or other electronic apparatus includes a reversible electric motor for selectively rotating a driving gear in opposed directions, a first swinging gear engaged with the driving gear and rotatably coupled to a co-axial second swinging gear with the common axis of the first and second swinging gears being mounted for orbital movements about the axis of the driving gear between first and second limited positions to which the common axis is urged in reaction to rotation of the driving gear in the opposite directions, respectively, a rotary cam member with peripheral gear teeth engageable by the second swinging gear and having a toothless gap that accommodates the second swinging gear to halt turning of the cam member, the shifting of the common axis of the swinging gears from one to the other of the limited positions thereof in response to a change in the direction of rotation of the drive gear being effective to move the second swinging gear out of the toothless gap and into engagement with the peripheral gear teeth for again turning the cam member, an actuating member engaging a cam surface on the rotary cam member and being reciprocally moved thereby in response to turning of the rotary cam member for changing a respective operation of the electronic apparatus, and a locking device for holding the rotary cam member against inadvertent turning from each position in which the second swinging gear is accommodated in the toothless gap.

3 Claims, 32 Drawing Figures

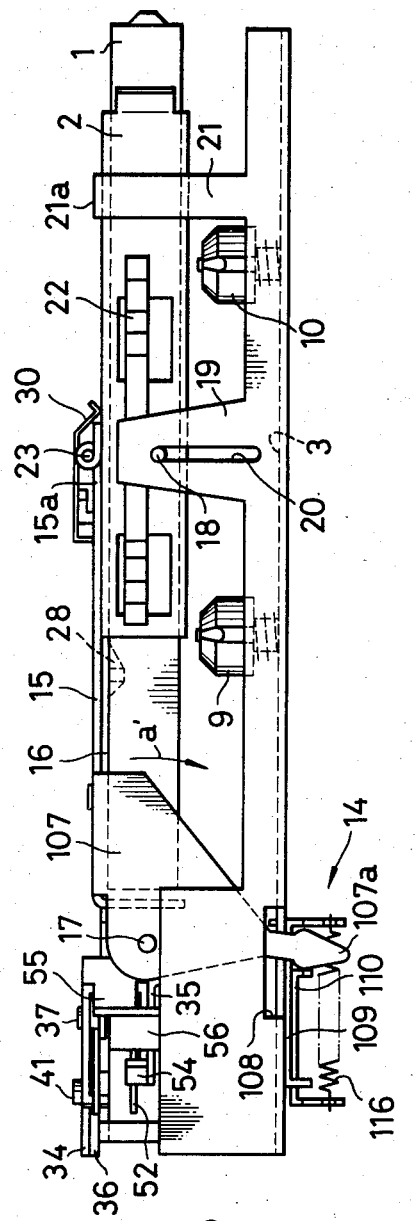
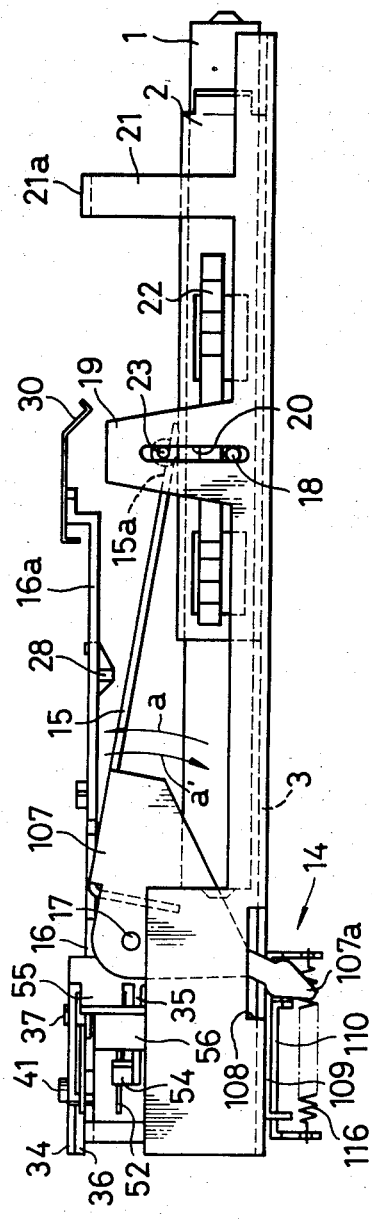
FIG. 2B
FIG. 2C

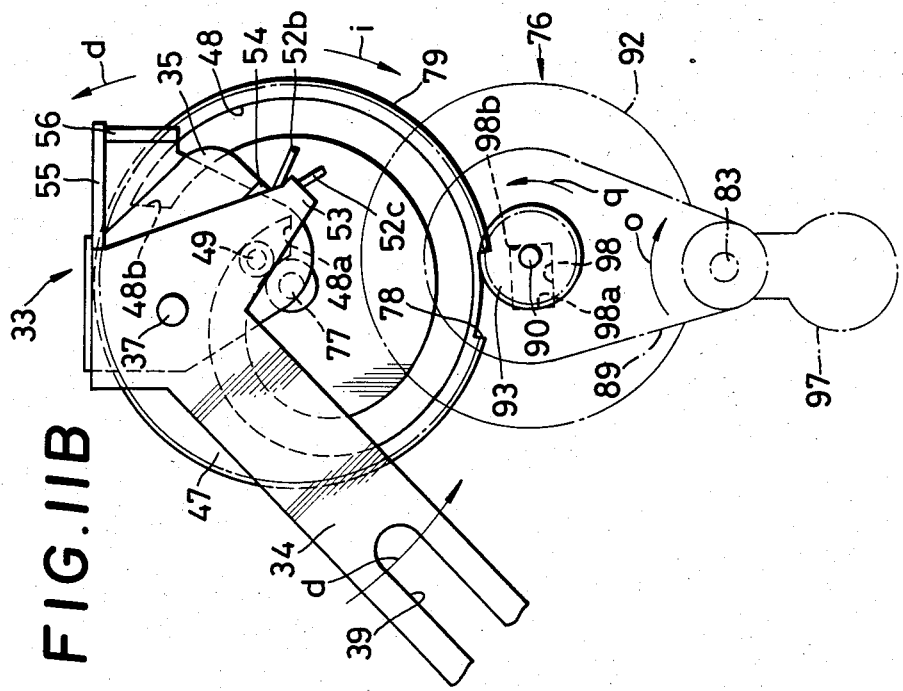
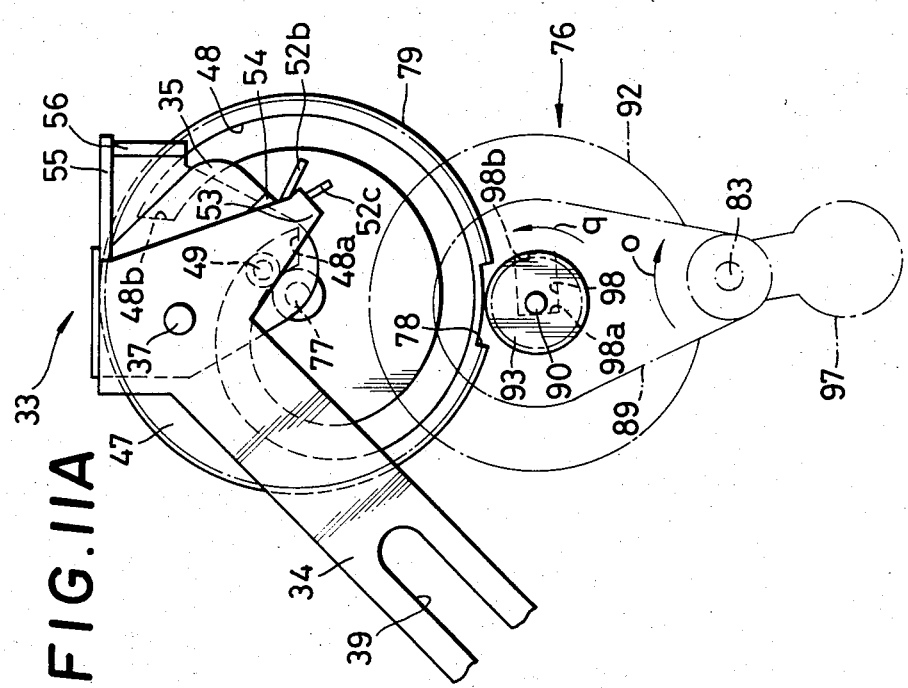

OPERATION CHANGING MECHANISM RESPONSIVE TO DIRECTION CHANGE OF A REVERSIBLE MOTOR

BACKGROUND OF THE INVENTION

1. Field of the Invention

The present invention relates generally to tape cassette players and, more particularly, is directed to an automatic mechanism for loading and ejecting a tape cassette, such as a compact cassette, a microcassette, or a video cassette in a tape cassette player, such as a car stereo, video tape recorder (VTR) or the like.

2. Description of the Prior Art

In known electronic equipment, various operation changing mechanisms used as drive operative members are known which are intermittently driven by changing gears with toothless portions and having at least one cam thereon. In such known operation changing mechanisms, when operation of the mechanism starts, the changing gear is initially rotated by a predetermined angle, whereby to mesh with a driving roller which subsequently controls rotation of the changing gear. For example, in U.S. Pat. No. 4,225,894, having a common assignee herewith, locking means for such a changing gear formed with a toothless portion, is released by utilizing a plunger which is displaced by an energized solenoid, so that a spring-biased lever then initially rotates the changing gear. In U.S. Pat. No. 4,313,142, a changing gear formed with a toothless portion is initially rotated by the magnetic force resulting from an energized coil. In either case, an electromagnetic device is required to initially drive the changing gear. However, the first-mentioned known operation changing mechanism may be relatively complex in construction and inefficient in operation by the necessity of providing a locking mechanism which is released by a plunger. In the second-mentioned known mechanism utilizing a magnetic force for rotating the changing gear, it is necessary to fix a magnet on the changing gear formed with a toothless portion, so that the mechanism becomes relatively expensive and complex.

OBJECTS AND SUMMARY OF THE INVENTION

Accordingly, it is an object of this invention to provide an operation changing mechanism for a tape recording/reproducing apparatus that avoids the above-described difficulties encountered with the prior art.

More particularly, it is an object of this invention to provide an operation changing mechanism for a tape recording/reproducing apparatus in which rotation of an operation changing gear is controlled through an intermediate transmission assembly by a motor.

It is another object of this invention to provide an operation changing mechanism for a tape recording/reproducing apparatus which does not require any auxiliary device to impart an initial drive to an operation changing gear thereof, resulting in a mechanism which is relatively simple in construction and inexpensive to manufacture.

It is still another object of this invention to provide an operation changing mechanism for a tape recording/reproducing apparatus having a mechanism for locking a changing roller at either of two predetermined positions which is relatively simple in construction and inexpensive to manufacture.

In accordance with an aspect of this invention, an operation changing mechanism includes between first and second limited positions to which the comon axis is urged in reaction to rotation of the driving gear in the opposite directions, respectively, a rotary cam member with peripheral gear teeth engageable by the second swinging gear and having a toothless gap that accommodates the second swinging gear to halt turning of the cam member, the shifting of the common axis of the swinging gears from one to the other of the limited positions thereof in response to a change in the direction of rotation of the drive gear being effective to move the second swinging gear out of the toothless gap and into engagement with the peripheral gear teeth for again turning the cam member, an actuating member engaging a cam surface on the rotary cam member and being reciprocally moved thereby in response to turning of the rotary cam member for changing a respective operation of the electronic apparatus, and a locking device for holding the rotary cam member against inadvertent turning from each position in which the second swinging gear is accommodated in the toothless gap.

The above, and other, objects, features and advantages of the present invention will become readily apparent from the following detailed description thereof which is to be read in connection with the accompanying drawings.

BRIEF DESCRIPTION OF THE DRAWINGS

FIG. 2B is a schematic elevational view of the operation changing mechanism of FIG. 2A, illustrated in an intermediate position;

FIG. 2C is a schematic elevational view of the operation changing mechanism of FIG. 2A, illustrated in a tape loading position;

FIG. 11A is a schematic top plan view of the pulling operation lever and pulling drive lever of FIG. 9, illustrated in the ejection completion position;

FIG. 11B is a schematic top plan view of the pulling operation lever and pulling drive lever of FIG. 9, illustrated in an intermediate tape loading position;

DETAILED DESCRIPTION OF THE PREFERRED EMBODIMENTS

Figure 1A:
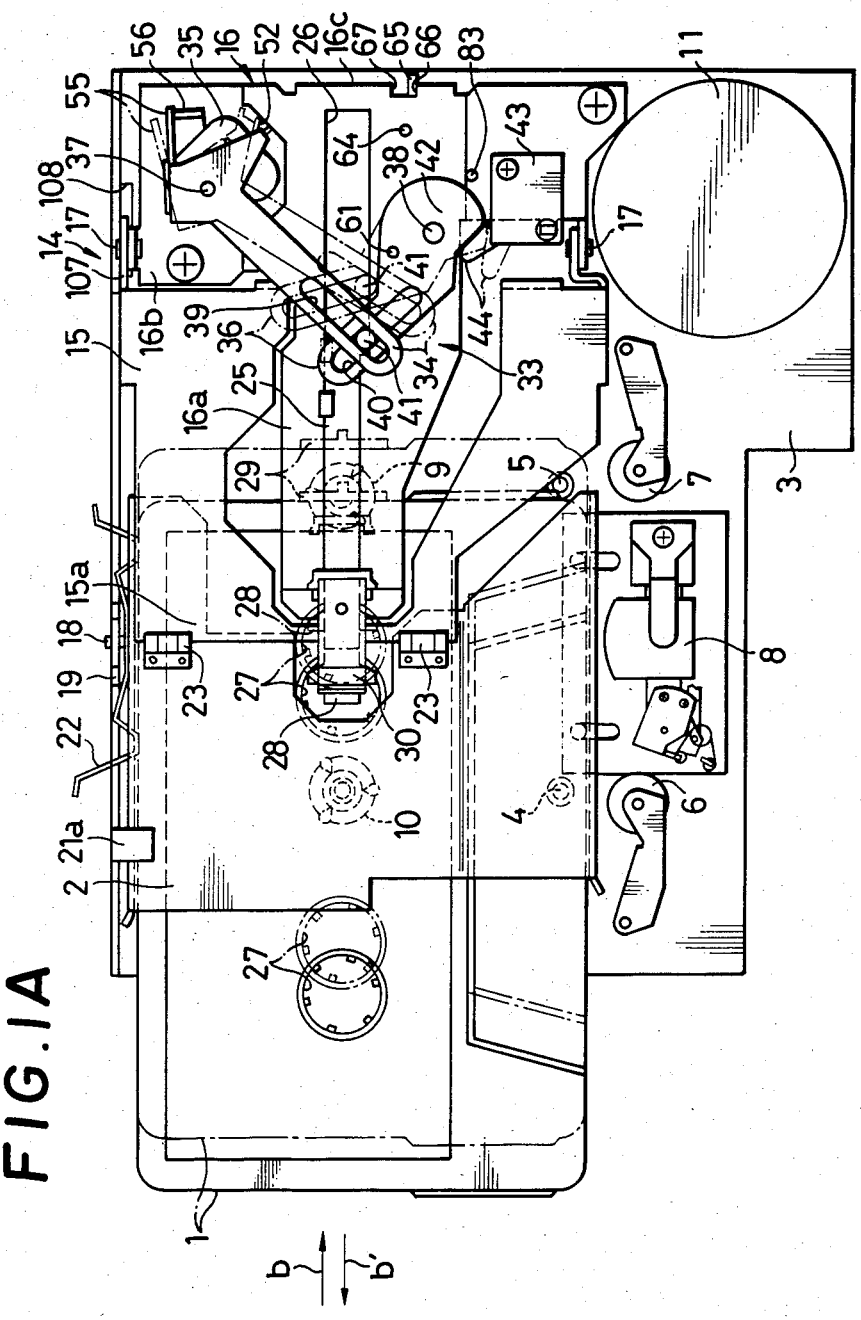
FIG. 1A is a schematic top plan view of an operation changing mechanism according to one embodiment of the present invention, illustrated in a tape ejecting position.

Referring to the drawings in detail, and initially to FIGS. 1A–2C thereof, a loading mechanism according to one embodiment of the present invention for loading a tape cassette 1 into a tape player, for example, a car stereo having an automatic reverse operation, includes a cassette holder 2 for loading the tape cassette, and a chassis 3 on which cassette holder 2 is mounted. A pair of capstans 4 and 5 are mounted on chassis 3, along with a pair of pinch rollers 6 and 7 in opposing relation to capstans 4 and 5, respectively, for pinching the tape of tape cassette 1 therebetween and thereby driving the tape. A magnetic head 8, supply and take-up reel shafts 9 and 10, a drive motor 11 and the like are also arranged on chassis 3 in a conventional manner. It is to be noted that only one motor 11 is provided for driving the capstans, reel shafts, pinch roller mechanisms and an operation changing mechanism which will be described in greater detail later.

Figure 1B:
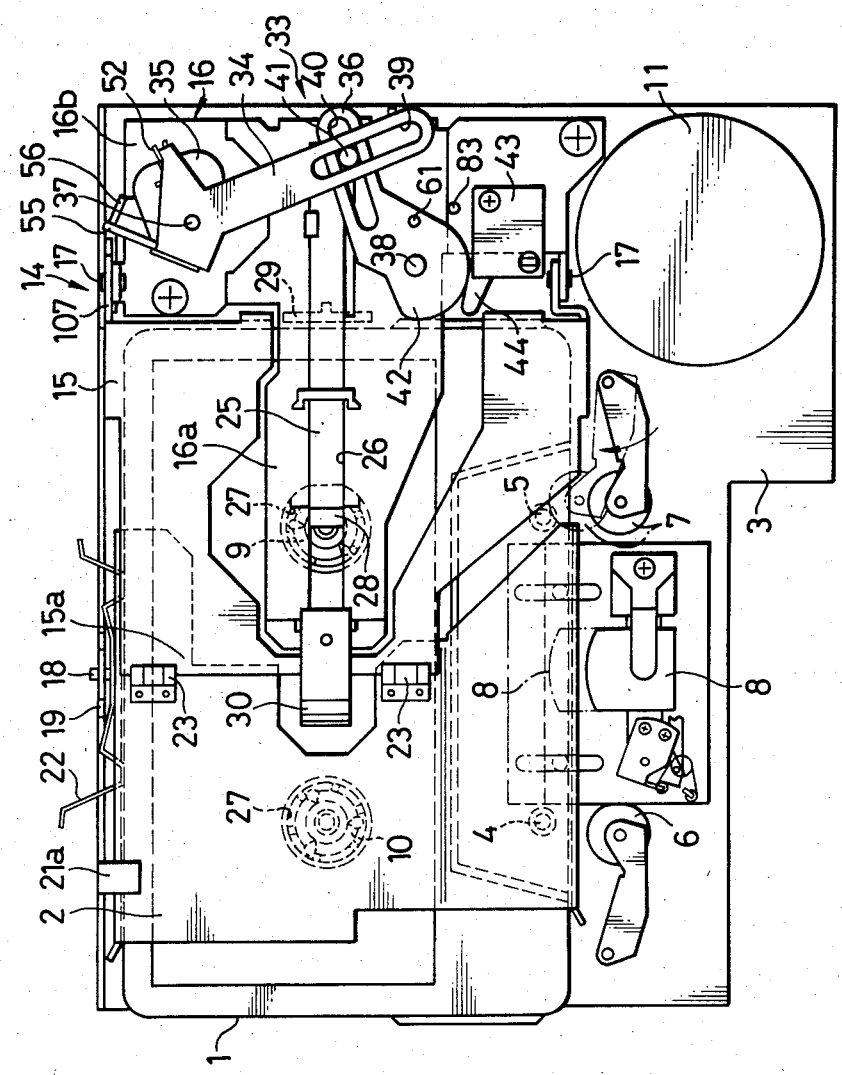
FIG. 1B is a schematic top plan view of the operation changing mechanism of FIG. 1, illustrated in a tape loading position.
Figure 2A:
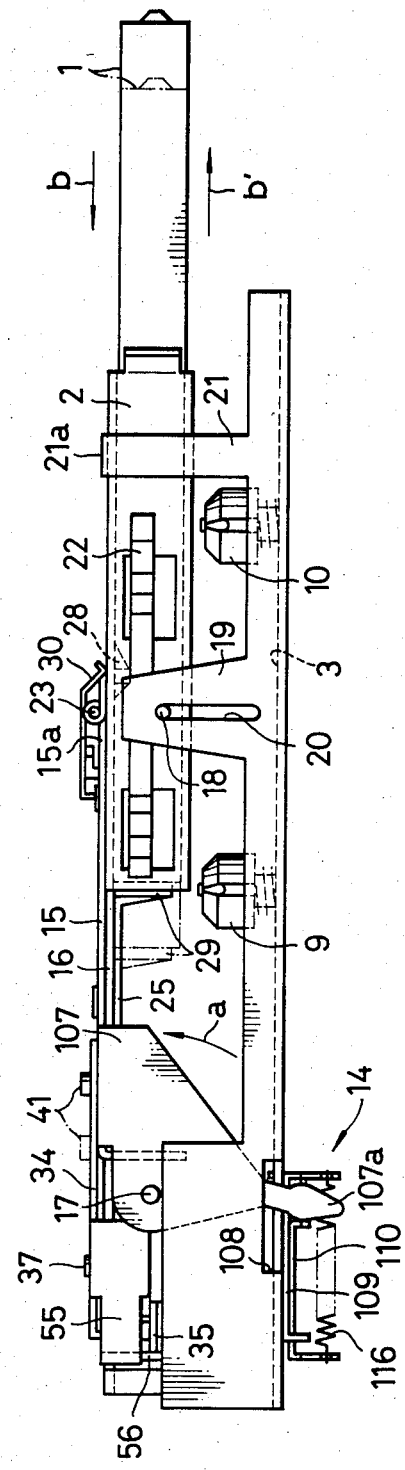
FIG. 2A is a schematic elevational view of the operation changing mechanism of FIG. 1A, illustrated in the tape ejecting position.

As shown in FIGS. 1A–2C, a cassette elevating mechanism 14 is provided for moving cassette holder 2 between an elevated cassette ejecting position shown in FIG. 2A and a cassette loading position shown in FIG. 2C. Cassette elevating mechanism 14 includes an elevating drive plate 15 which is mounted to rotate in the vertical direction on a pair of pivot pins 17 which, in turn, are horizontally and coaxially secured to a subchassis 16 at a predetermined height, subchassis 16 being mounted on one end of main chassis 3, also at a predetermined height. Cassette holder 2 is pivotally mounted on the lower surface of the distal end 15a of elevating drive plate 15 by means of hinges 23, and elevating drive plate 15, and thereby cassette holder 2, are normally biased by a spring, to be described later, in the direction indicated by arrow a shown in FIG. 2A, so that cassette holder 2 is normally biased upwardly toward the cassette ejecting position shown in FIG. 2A. As shown in FIGS. 1A and 2A, vertical movement of cassette holder 2 is limited by abutment against an upper end 21a of a substantially L-shaped height regulating plate 21 standing upright at one side of main chassis 3. In addition, a pin 18 which is horizontally fixed to one side of cassette holder 2 is inserted in a vertical guide groove 20 formed in an upstanding guide plate 19 at one side of main chassis 3.

Tape cassette 1 is inserted into cassette holder 2 from its longitudinal direction indicated by arrow b in FIGS. 1A and 2A, and a leaf spring 22 fixed to one side of cassette holder 2 provides a frictional force for holding tape cassette 1 in cassette holder 2 by elastically pushing on one side of tape cassette 1 when the latter is inserted in cassette holder 2. As shown in FIGS. 1A–2C, a cassette pulling member 25 is mounted along the center of an upper horizontal portion 16a of subchassis 16 and is movable horizontally in the direction indicated by arrow b, along a guide groove 26 formed along upper horizontal portion 16a. Cassette pulling member 25 is preferably a molded synthetic resin product. An engaging portion 28 for engaging with one of a pair of reel shaft insertion holes 27 formed in tape cassette 1 is formed integrally with the distal end of cassette pulling member 25, and a leaf spring 30 for elastically urging downward the distal end of cassette pulling member 25 is fixed to the distal end of upper horizontal portion 16a. In addition, a stopper member 29 for restricting rearward movement of tape cassette 1 is formed integrally with the lower surface at the rear end of cassette pulling member 25.

Referring now to FIGS. 3A–5, an automatic pulling mechanism 33 which drives cassette pulling member 25 to automatically pull tape cassette 1 into cassette holder 2 generally includes a pulling operation lever 34, a pulling drive lever 35 and a switch operation lever 36. Pulling operation lever 34 and pulling drive lever 35 vertically overlap each other and are pivotally mounted on a pivot pin 37 which stands upright on upper horizontal portion 16a of subchassis 16. Switch operation lever 36 is also pivotally mounted on upper horizontal portion 16a of subchassis 16 through a pivot pin 38, with pivot pins 37 and 38 being arranged on opposite sides of guide groove 26. Further, the distal ends of pulling operation lever 34 and switch operation lever 36 vertically overlap each other in a substantially V-shape above guide groove 26. A pair of elongated holes or slots 39 and 40 are respectively formed at the distal ends of levers 34 and 36 and partially overlap so as to receive therein a pin 41 which is formed integrally with the upper surface at the rear end of cassette pulling member 25 and which slidably connects levers 34 and 36 together.

Figure 3A:
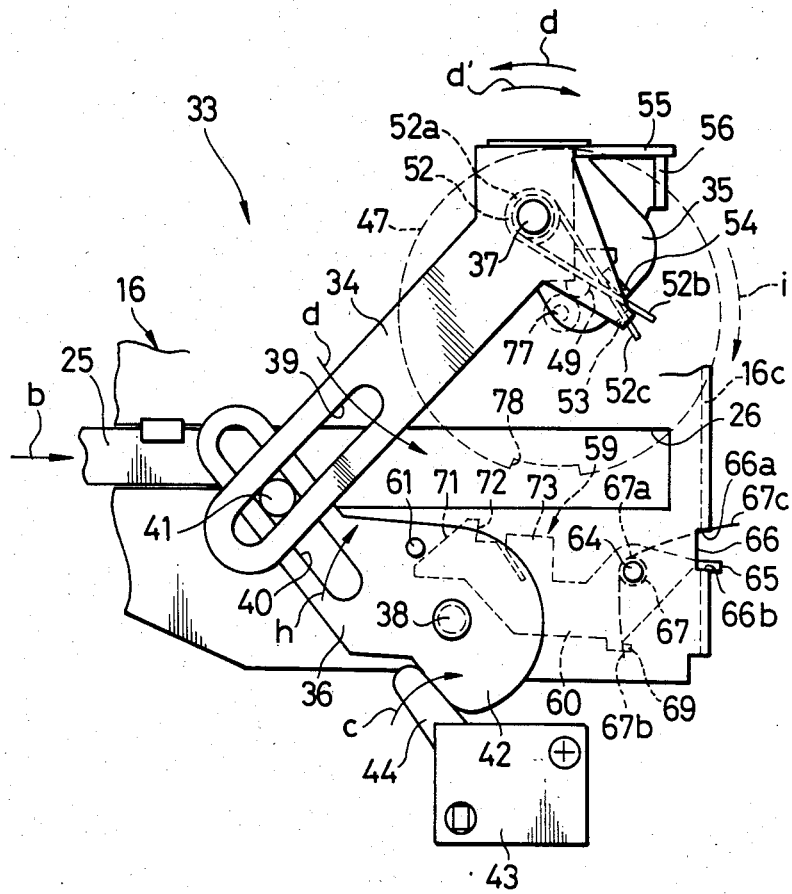
FIG. 3A is a schematic top plan view of a cassette pulling assembly of the operation changing mechanism of FIG. 1A, illustrated in the tape ejecting position.
Figure 3B:
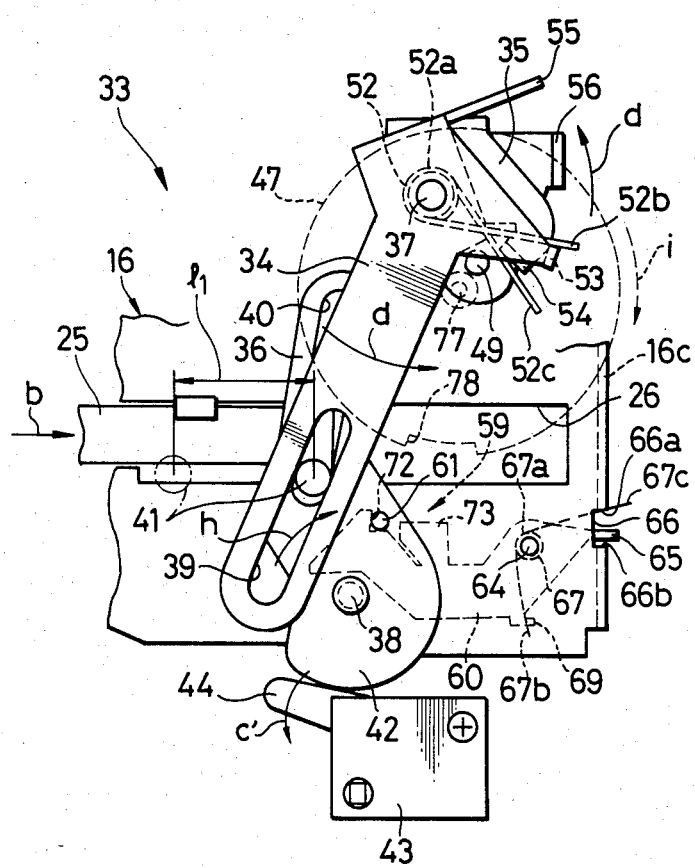
FIG. 3B is a schematic top plan view of the cassette pulling assembly of the operation changing mechanism of FIG. 3A, illustrated in an intermediate pulling position.
Figure 3C:
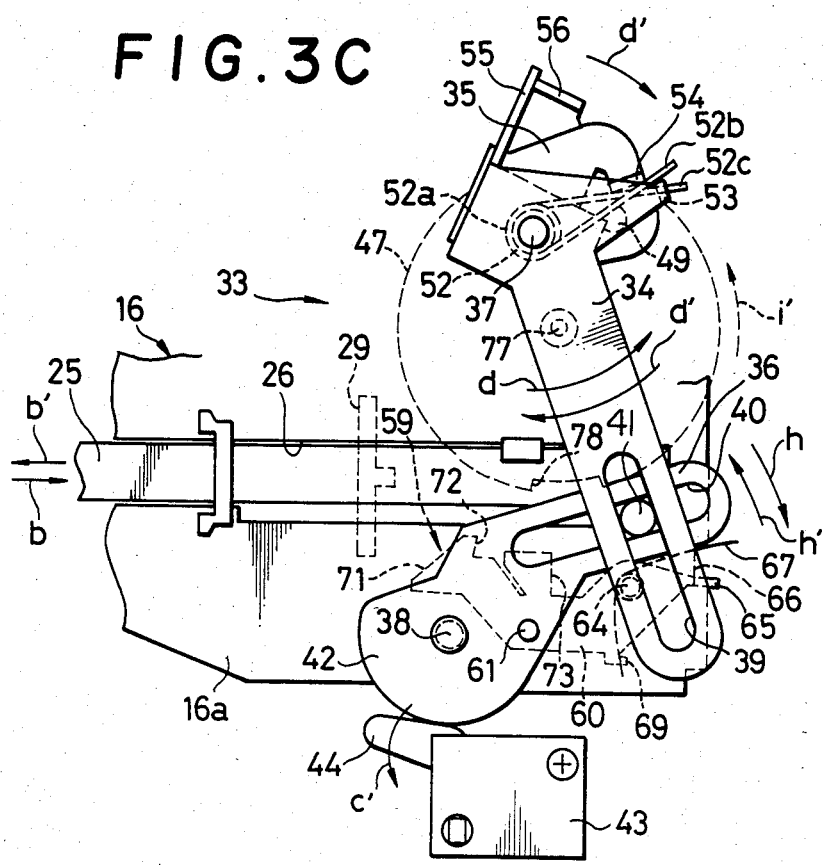
FIG. 3C is a schematic top plan view of the cassette pulling assembly of the operation changing mechanism of FIG. 3A, illustrated in the tape loading position.

As shown in FIGS. 3A–3C, a switch operation cam 42 is formed integrally at the portion of switch operation lever 36 which surrounds pivot pin 38. A cassette detection switch 43 is mounted in the vicinity of switch operation cam 42 above upper horizontal portion 16a of subchassis 16 and includes an operative lever 44 which is normally pivoted in the direction indicated by arrow c in FIG. 3A by a return spring (not shown) of cassette detection switch 43, and which is adapted to be pivoted in the direction indicated by arrow c' in FIG. 3C by switch operation cam 42 during movement of lever 36.

Figure 5:
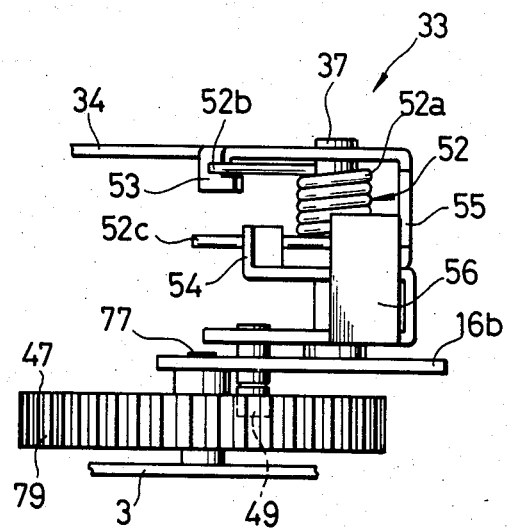
FIG. 5 is a schematic elevational view of the cassette pulling asssembly of the operation changing mechanism of FIG. 3A.
Figure 4:
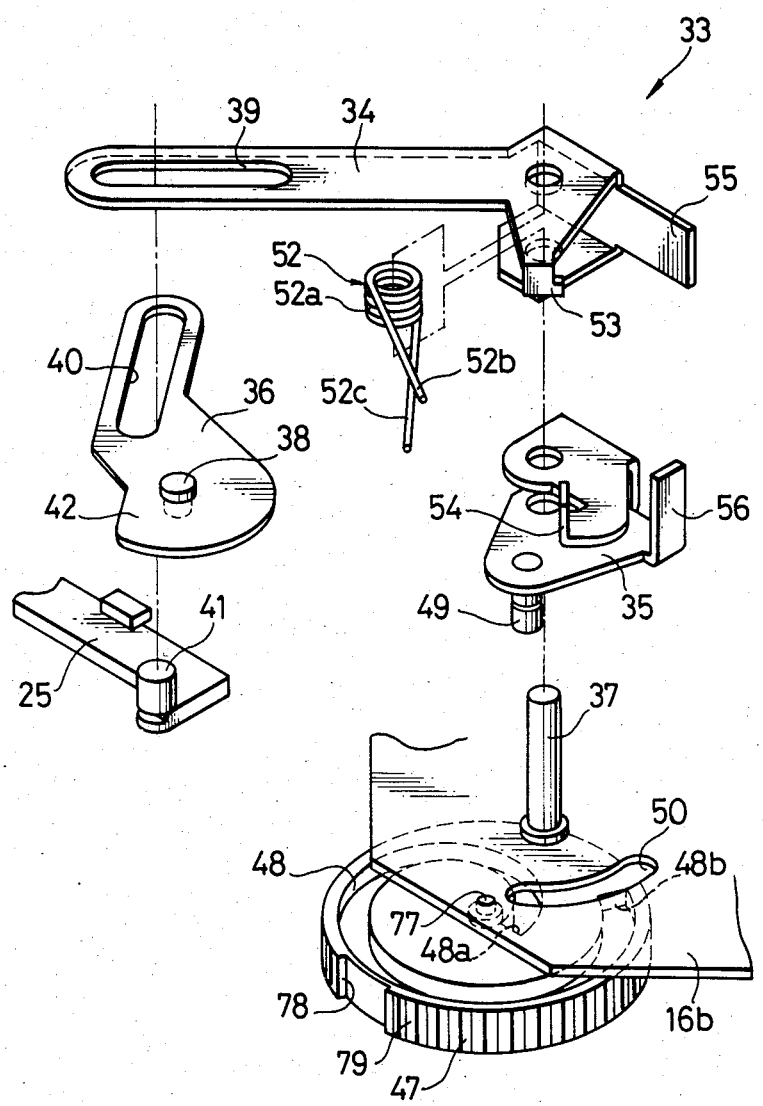
FIG. 4 is a schematic exploded perspective view of the cassette pulling assembly of the operation changing mechanism of FIG. 3A.
Figure 12:
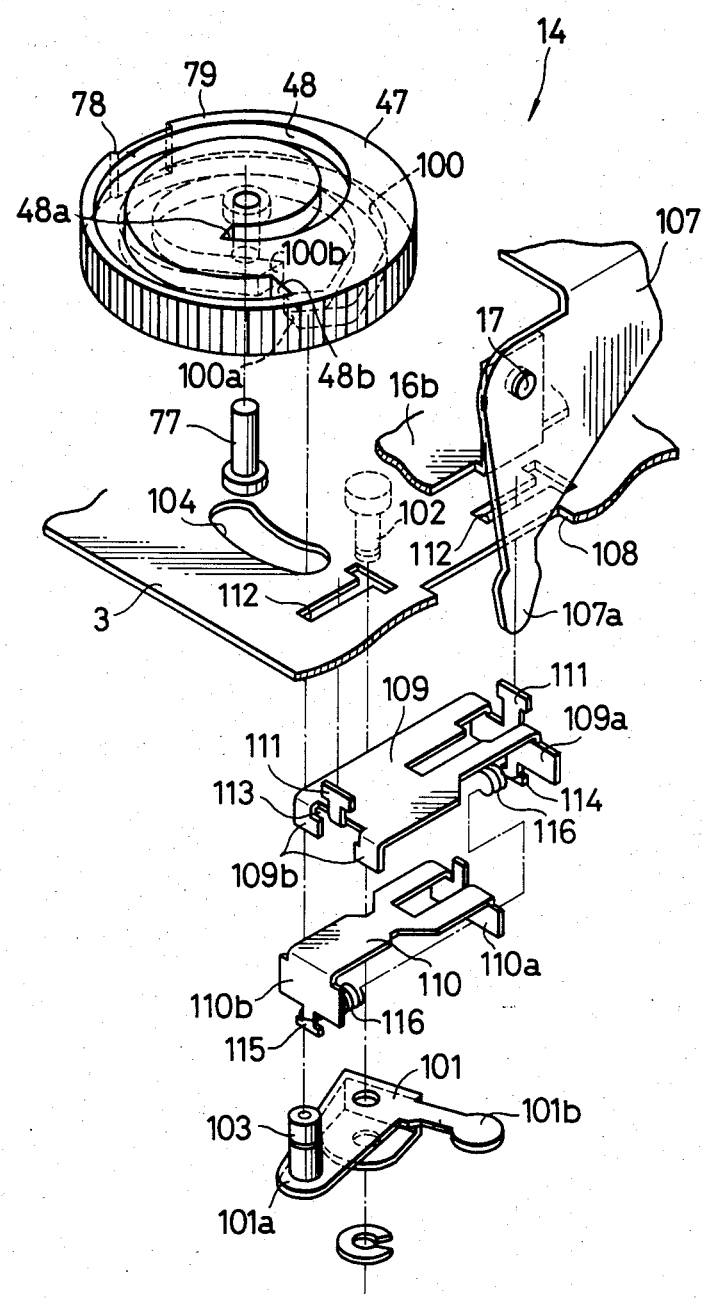
FIG. 12 is a schematic exploded perspective view of the changing roller, control member and elevating drive lever of the mechanism of FIG. 9.

Referring now to FIGS. 4, 5 and 12, a changing roller or gear 47 having rotary cam member teeth along a substantial part of the periphery thereof and also formed with a toothless portion includes cam grooves 48 and 100 at the upper and lower planar surfaces thereof for use in an operation changing mechanism, as will be described later, and is mounted on chassis 3 below pulling drive lever 35. Changing roller 47 revolves and is mounted on a central pin 77 which is offset from pivot pin 37, and is driven in the clockwise or counter-clockwise direction by aforementioned motor 11. First cam groove 48 is of a substantially spiral shape formed in the upper surface of changing roller 47 and an idler wheel 49 pivotally mounted on the lower surface of pulling drive lever 35 extends through an arcuate hole or slot 50 formed in a lower horizontal portion 16b of subchassis 16 into engagement with grooved cam 48. When changing roller 47 is driven in the clockwise or counter-clockwise direction, pulling drive lever actuating member 35 is driven in the direction indicated by arrow d or d', respectively, by grooved cam 48 through idler wheel 49. Further, a return spring 52 is interposed between pulling operation lever 34 and pulling drive lever 35 such that a coil portion 52a of return spring 52 surrounds the outer surface of pivot pin 37, and two ends 52b and 52c of return spring 52 are hooked on projections 53 and 54 integrally formed with pulling operation lever 34 and pulling drive lever 36, respectively. In this regard, pulling operation lever 34 is normally biased with respect to pulling drive lever 35 in the direction indicated by arrow d' shown in FIG. 3A by the biasing force of return spring 52, whereby a projection 55 formed integrally with pulling operation lever 34 abuts against a projection 56 formed integrally with pulling drive lever 35, so that pivotal movement of pulling operation lever 34 in the direction indicated by arrow d' is limited. Since idler wheel 49 of pulling drive lever 35 engages with first cam groove 48 of changing roller 47, pulling drive lever 35 is limited in position in correspondence with the rotation of changing roller 47.

Figure 6:
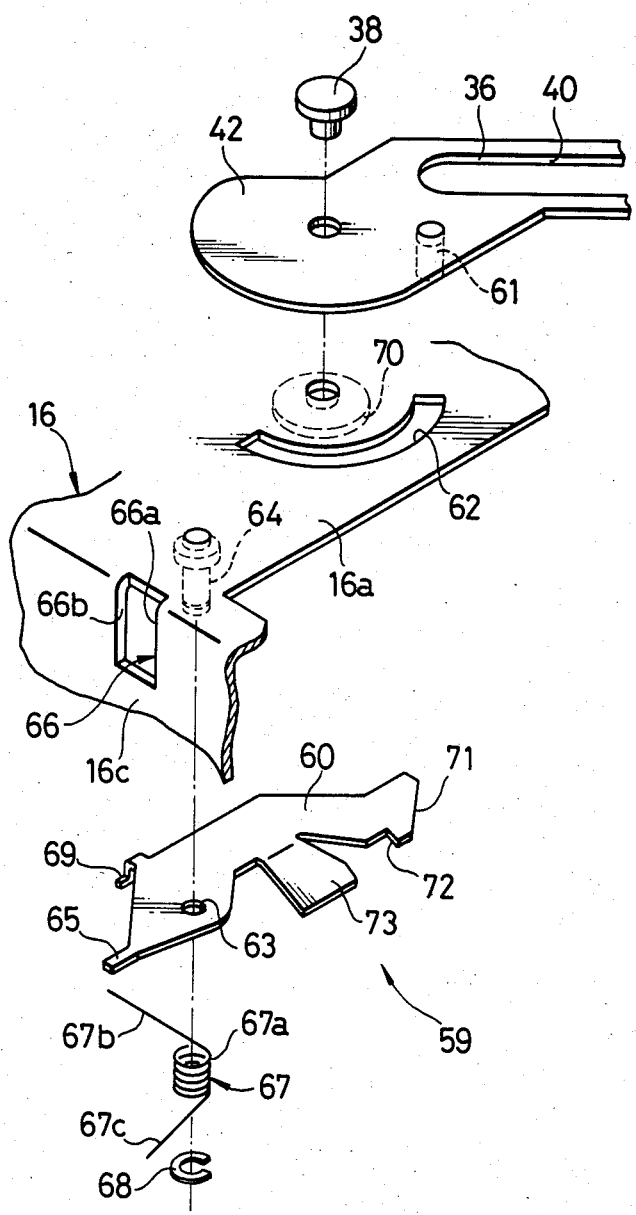
FIG. 6 is a schematic exploded perspective view of a switch operation lever and locking plate of the operation changing mechanism of FIG. 1A.

A locking mechanism 59 for locking cassette pulling member 25 during its reciprocating movement is shown in FIGS. 6–8C to include a locking plate 60 which serves to lock switch operation lever 36, the latter being interlocked with cassette pulling member 25 by means of pin 41. More particularly, an idler pin 61 is fixed to the lower surface of switch operation cam 42 of switch operation lever 36 and projects downwardly through an arcuate hole or slot 62 formed in upper horizontal portion 16a of subchassis 16. Locking plate 60 functions to lock idler pin 61 and is arranged below upper horizontal portion 16a. As shown in FIG. 6, locking plate 60 has an aperture 63 formed at one end thereof and which receives a pivot pin 64 extending perpendicularly from the lower surface of upper horizontal portion 16a to which it is secured. Further, a projection 65 formed at the same end of locking plate 60 is loosely inserted in a wide elongated hole 66 which is formed in a vertical portion 16c of subchassis 16 which connects upper and lower horizontal portions 16a and 16b. A coiled portion 67a of a return spring 67 surrounds pivot pin 64 below locking plate 60 and is fixed thereon by a washer 68, with the two end 67b and 67c of return spring 67 abutting against a projection 69 formed integrally with locking plate 60 and with one side edge 66a of elongated hole 66, respectively.

Figure 7A:
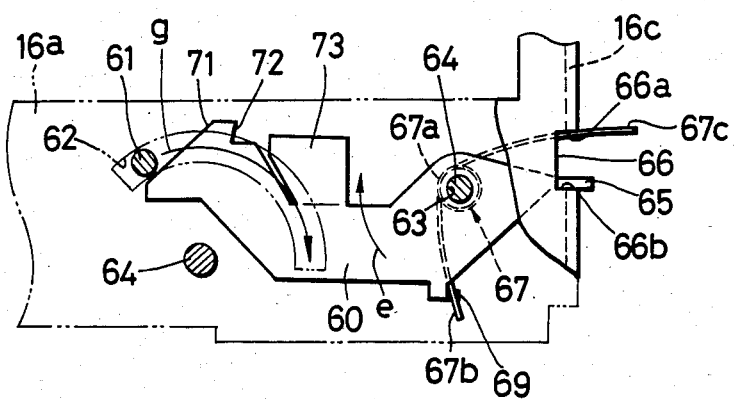
FIG. 7A is a schematic top plan view of a portion of the switch operation lever and locking plate of FIG. 6, illustrated in the tape ejecting positions.
Figure 7B:
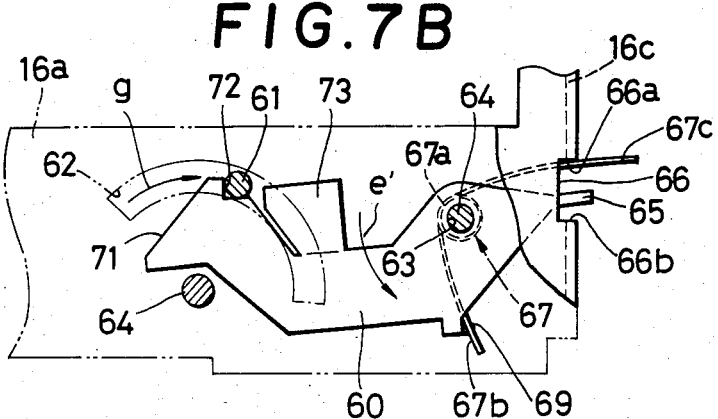
FIG. 7B is a schematic top plan view of a portion of the switch operation lever and locking plate of FIG. 7A, illustrated in an intermediate loading position.
Figure 7C:
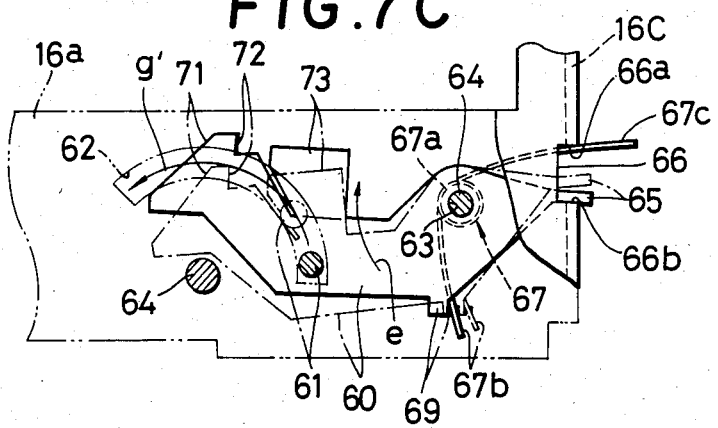
FIG. 7C is a schematic top plan view of a portion of the switch operation lever and locking plate of FIG. 7A, illustrated in the tape loading position.
Figure 8A:
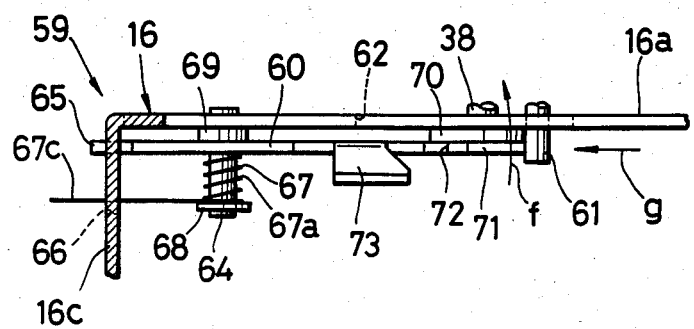
FIG. 8A is a schematic elevational view of the switch operation lever and locking plate of FIG. 7A.
Figure 8B:
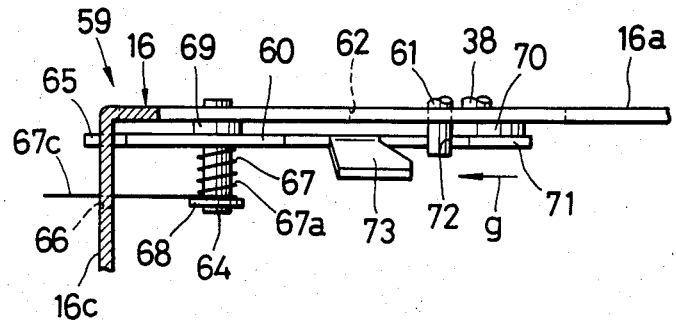
FIG. 8B is a schematic elevational view of the switch operation lever and locking plate of FIG. 7B.
Figure 8C:
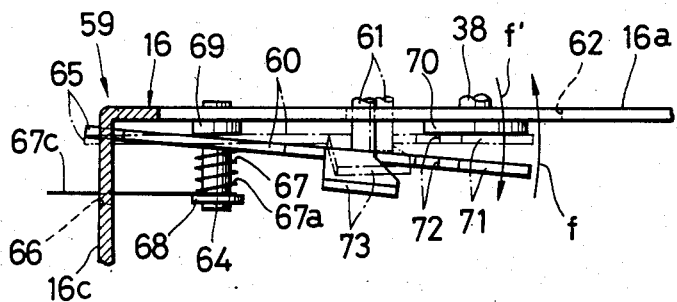
FIG. 8C is a schematic elevational view of the switch operation lever and locking plate of FIG. 7C.

With such arrangement, locking plate 60 is pivotally movable about the axis of pivot pin 64 within a horizontal plane and is also pivotally movable about pivot pin 64 within a vertical plane parallel to the axis of pivot pin 64, as shown in FIG. 8C. In particular, locking plate 60 is normally horizontally pivoted about pivot pin 64 in the direction indicated by arrow e in FIG. 7A by the biasing force applied from the ends 67b and 67c of return spring 67. During such movement, projection 65 abuts against the other side edge 66b of elongated hole 66 to limit the horizontal pivotal movement of locking plate 60 in the direction indicated by arrow e, as shown in FIG. 7A. At the same time, locking plate 60 is vertically pivoted about pivot pin 64 in the direction indicated by arrow f in FIG. 8A by the biasing force of the coil portion 67a of return spring 67. As shown in FIG. 8A, locking plate 60 abuts against a projection 70 extending downwardly from the lower surface of upper horizontal portion 16a and is limited thereby in its vertical pivotal movement in the direction indicated by arrow f. In this manner, locking plate 60 mounted on subchassis 16 and idler pin 61 fixed to the lower surface of switch operation lever 36 initially assume the positional relationship shown in FIGS. 7A and 8A. It is to be noted from FIGS. 7A–7C that idler pin 61 is moved relative to locking plate 60 along an arcuate path g around pivot pin 64. In addition, and as will be described in greater detail hereinafter, an inclined surface 71, an engaging portion 72 and an inclined section 73 are formed integrally on one side edge of locking plate 60, respectively, from the distal end of locking plate 60 toward pivot pin 64.

The mode of operation of cassette elevating mechanism 14 and automatic pulling mechanism 33 having the structure described above will now be described with reference to FIGS. 1A–8C. When tape cassette 1 is ejected, cassette holder 2 is returned to the cassette ejecting position shown in FIG. 2A and cassette pulling member 25 is returned to the inactive position indicated by the solid lines, respectively, in FIGS. 1A, 2A and 3A. In this ejected state, idler pin 61 of switch operation lever 36 assumes the positional relationship with locking plate 60 shown in FIG. 7A, and cassette detection switch 43 is thereby turned OFF.

When tape cassette 1 is inserted into cassette holder 2 in the direction indicated by arrow b in FIGS. 1A and 2A to a certain extent, one end of tape cassette 1 abuts against stopper member 29 of cassette pulling member 25, as shown by the solid line in FIG. 2A. It is to be noted that immediately before the rear end of tape cassette 1 abuts against stopper member 29, engaging portion 28 at the distal end of cassette pulling member 25 slides over the upper surface of tape cassette 1 and automatically engages with one of reel shaft insertion holes 27 by means of its own biasing force and the biasing force of leaf spring 30.

When the rear end of tape cassette 1 abuts against stopper member 29 of cassette pulling member 25, and tape cassette 1 is pushed further in the direction indicated by arrow b in FIGS. 1A and 2A, cassette pulling member 25 is pushed or moved by tape cassette 1 against the biasing force of return spring 52 acting on pulling operation lever 34. More particularly, cassette pulling member 25 is moved by tape cassette 1 from the inactive position shown in FIG. 3A in the direction indicated by arrow b. As a result, pin 41 of cassette pulling member 25 pushes pulling operation lever 34 and switch operation lever 36 in the directions indicated by arrows d and h, respectively, as shown in FIG. 3A. At this time, one end 52b of return spring 52 is urged by projection 53 of pulling operation lever 34 in the direction indicated by arrow d in FIG. 3A, so that return spring 52 is twisted. As a consequence, cassette pulling member 25 is moved in the direction indicated by arrow b in FIG. 3A against the biasing force of return spring 52.

When cassette pulling member 25 is moved from the inactive position shown in FIG. 3A for a predetermined distance $l_1$ to the position indicated by the imaginary line shown in FIGS. 1A and 2A, and as shown in FIG. 3B, operative lever 44 of cassette detection switch 43 is biased in the direction indicated by arrow c' by switch operation cam 42 of switch operation lever 36 and cassette detection switch 43 is turned ON. Further, when switch operation lever 36 is pivoted in the direction indicated by arrow h from the inactive position shown in FIG. 3A to the position shown in FIG. 3B, idler pin 61 of switch operation lever 36 is pivoted in the direction indicated by arrow g from the inactive position shown in FIGS. 7A and 8A to the position shown in FIGS. 7B and 8B, whereby idler pin 61 is urged against inclined surface 71 of locking plate 60. By the guiding function of inclined surface 71, locking plate 60 is horizontally pivoted in the direction indicated by arrow e' shown in FIG. 7B against the biasing force of return spring 67, whereupon idler pin 61 rides over inclined surface 71 and engages with engaging portion 72 of locking plate 60, as shown in FIGS. 7B and 8B. When idler pin 61 is locked as shown in FIG. 7B, cassette pulling member 25 is locked in position by means of switch operation lever 36.

When cassette detection switch 43 is turned ON in this manner, motor 11 is driven in the clockwise direction so that one of capstans 4 and 5 shown in FIG. 1A is driven depending upon the desired drive direction and, at the same time, changing roller 47 is driven in the direction indicated by arrow i in FIG. 3B, as will be described in greater detail hereinafter. Idler wheel 49 is then driven by grooved cam 48 of changing roller 47, whereupon pulling drive lever 35 is pivoted in the direction indicated by arrow d in FIG. 3B. The twisting force acting on return spring 52 is thereby eliminated, and projection 56 of pulling drive lever 35 abuts against projection 55 of the pulling operation lever 34, as shown in FIG. 3C. Thereafter, pulling operation lever 34 is pushed by pulling drive lever 35 and is forcibly pivoted in the direction indicated by arrow d. Accordingly, cassette pulling member 25 is forcibly moved by pulling operation lever 34 in the direction indicated by arrow b in FIG. 3C.

As a consequence, tape cassette 1 is automatically pulled by engaging portion 28 of cassette pulling member 25 in the direction indicated by arrow b and is automatically pulled to a predetermined position within cassette holder 2, shown in FIGS. 1B and 2B. Although switch operation lever 36 is rotated in the direction indicated by arrow h in FIG. 3C, switch operation cam 42 holds operative lever 44 of cassette detection switch 43 pushed in the direction indicated by arrow c'. Accordingly, cassette detection switch 43 is maintained in an ON condition until tape cassette is ejected.

Meanwhile, when switch operation lever 36 is pivoted from the position shown in FIG. 3B to the position shown in FIG. 3C, idler pin 61 of switch operation lever 36 is moved in the direction indicated by arrow g from the position shown in FIGS. 7B and 8B to the position shown in FIGS. 7C and 8C. Upon such continued pivotal movement of idler pin 61, the latter is disengaged from engaging portion 72 of locking plate 60 and is moved to a position above inclined section 73. Locking plate 60 is then pushed downward by the guiding or biasing operation of idler pin 61 on inclined section 73. Thus, locking plate 60 is pivoted in the direction indicated by arrow f' against the coil portion of return spring 67, as shown by the solid line in FIG. 8C, and is also moved by return spring 67 in the direction indicated by arrow e, as shown by the solid line in FIG. 7C, whereupon idler pin 61 slides over locking plate 60. Upon completion of the above operation, the series of operations for automatic insertion of tape cassette 1 into cassette holder 2 is completed.

As described above, after tape cassette 1 is automatically pulled into cassette holder 2, elevating drive plate 15 is rotated about pivot pins 17 in the direction indicated by arrow a' in FIG. 2B, as will be described in greater detail hereinafter. As a result, cassette holder 2 is pushed downward at the connection thereto to hinges 23 of elevating drive plate 15, whereby cassette holder 2 is lowered while remaining substantially horizontally positioned and as guided by guide pin 18 and guide groove 20 to the loading position shown in FIG. 2C. In such position, tape cassette 1 engages with capstans 4 and 5, reel shafts 9 and 10 and the like and is held in such position. As shown in FIG. 2C, as tape cassette 1 is lowered, engaging portion 28 of cassette pulling member 25 is removed from the respective reel shaft insertion hole 27 of tape cassette 1. After tape cassette 1 is loaded to the loading position, magnetic head 8 is guided into tape cassette 1 as indicated by the dot-dash line shown in FIG. 1B and is brought into contact with the tape therein and, at the same time, one of pinch rollers 6 and 7 is inserted into tape cassette 1 and is urged against the corresponding one of capstans 4 and 5, thereby automatically initiating normal or reverse reproduction.

Ejection of tape cassette 1 is performed by the reverse operation to the automatic pulling operation and lowering operation of tape cassette 1 described above, that is, by reverse rotation of motor 11 actuated by means such as a push-button or the like (not shown). More specifically, elevating drive plate 15 is first pivoted in the direction indicated by arrow a in FIG. 2C, and cassette holder 2 is returned to the cassette ejecting position shown in FIG. 2B. Engaging portion 28 of cassette pulling member 25 is then re-engaged with the respective reel shaft insertion hole 27 of tape cassette 1. Subsequently, pulling drive lever 35, and also pulling operation lever 34, are pivoted in the direction indicated by arrow $d'$ in FIG. 3C, and cassette pulling member 25 is thereby moved in the direction indicated by arrow $b'$ in FIG. 3C. As a result, stopper member 29 of cassette pulling member 25 is urged against tape cassette 1, which is then automatically ejected out of cassette holder 2 in the direction indicated by arrow $b'$ in FIGS. 1A and 2A. At this time, switch operation lever 36 is pivoted in the direction indicated by arrow $h'$ shown in FIG. 3C, and idler pin 61 thereof is moved in the direction indicated by arrow $g'$ in FIG. 7C, whereupon idler pin 61 slides over locking plate 60 but is not engaged with engaging portion 72 thereof. When idler pin 61 is completely moved to the inactive position shown in FIG. 7A, locking plate 60 is pivoted by return spring 67 in the direction indicated by arrow $f$ in FIG. 8C and is moved to the initial position shown in FIG. 8A.

With the automatic pulling mechanism 33 as described above, switch operation lever 36 which is interlocked with cassette pulling member 25 has idler pin 61 formed thereon such that engaging portion 72 of locking plate 60 is engaged by idler pin 61 in order to prevent movement of locking plate 60 by return spring 52. It is to be noted that the guiding path of idler pin 61 with respect to locking plate 60 changes in accordance with the movement of idler pin 61 in the direction indicated the arrow $g$ in FIGS. 7A and 7B or in the direction indicated by arrow $g'$ shown in FIG. 7C. At the same time, engaging portion 72 is arranged in the guiding path of idler pin 61 as the latter moves toward its active position. When cassette pulling member 25 is pushed by tape cassette 1 from the inactive position shown in FIG. 3A for a predetermined distance $l_1$ to the position shown in FIG. 3B against the biasing force of return spring 52 so as to turn ON cassette detection switch 43, idler pin 61 engages with engaging portion 72 of locking plate 60 as shown in FIG. 7B, whereby cassette pulling member 25 is locked at this position, and its return movement from the locked position by the biasing force of return spring 52 is prevented. Assuming that tape cassette 1 is instantaneously inserted into cassette holder 2, if cassette pulling member 25 is pushed once against return spring 52 and cassette detection switch 42 is turned ON once, cassette pulling member 25 will not thereafter be returned by return spring 52. As a result, cassette detection switch 43 is maintained in an ON condition. For this reason, even if tape cassette 1 is instantaneously inserted into the cassette holder 2, the automatic pulling operation of tape cassette 1 into cassette holder 2 may be reliably performed.

Figure 9:
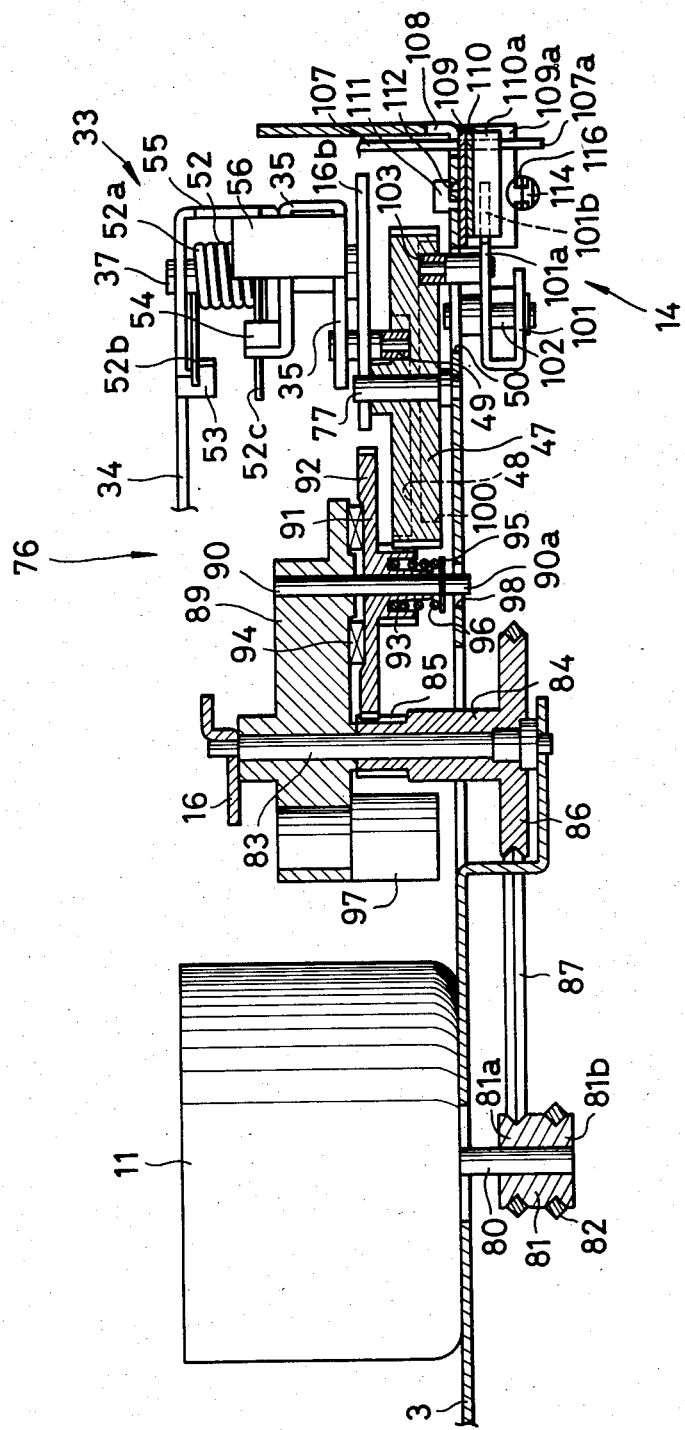
FIG. 9 is a schematic part-sectional, part elevational view of the operation changing mechanism of FIG. 1A.

An operation changing mechanism 76 according to this invention which selectively drives automatic pulling mechanism 33 and cassette elevating mechanism 14 will now be described with reference to FIGS. 9–14D. Referring first to FIGS. 9–11D, changing roller or rotary cam member 47 is rotatably mounted about central pivot pin 77 standing upright on chassis 3 and is formed on the outer periphery thereof with a toothed periphery or changing gear 79 having a toothless gap or portion 78, as previously discussed. As shown in FIG. 9, motor 11 includes a motor shaft 80 which is mounted on and projects below chassis 3, with a two-stepped pulley 81 being fixed to the lower end of motor shaft 80. A belt 82 is looped around a lower pulley 81$b$ of two-stepped puller 81 and capstan flywheels (not shown) serving as drive pulleys for capstans 4 and 5, so that motor 11 is capable of driving capstans 4 and 5. As described earlier, the reel shaft driving mechanism, pinch roller pinching mechanism, and automatic adjustment mechanism are driven by motor 11 through capstan flywheels and the like. As also shown in the Figures, an intermediate shaft 83 having its lower and upper ends rotatably mounted to chassis 3 and a part of subchassis 16, respectively, is located at an intermediate position between motor 11 and changing roller 47. A drive roller 84 is rotatably mounted about the lower half of intermediate shaft 83, and includes a driving gear 85 and a pulley 86 which are formed integrally at the upper and lower ends of drive roller 84. A belt 87 is looped around pulley 86 and an upper pulley 81$a$ of two-stepped pulley 81 for driving intermediate shaft 83. A swinging mounting member 89 is eccentrically mounted at the upper half of intermediate shaft 83 for swinging about the latter and a pin or shaft 90 is vertically fixed to the lower surface at one end of swinging member 89 so as to movable with the latter in an arcuate path about intermediate shaft 83, that is, about the axis of driving gear 85, with a swing roller 91 being rotatably mounted on pin or shaft 90 and also movable along the axial direction of swing pin 90. A balance weight 97 is arranged at the lower portion of the end of swinging member 89 which is opposite swing pin 90. Upper and lower or first and second swinging gears 92 and 93 having different diameters are formed integrally with upper and lower portions of roller 91, with upper gear 92 normally meshing with driving gear 85, and lower gear 93 selectively meshing with the peripheral gear teeth 79 of changing roller or rotary cam member 47. A friction plate 94 comprised of felt or the like is positioned around swing pin 90 between the lower surface of swinging member 89 and the upper surface of roller 91. Further, roller 91 is normally urged upward by a compression spring 96 mounted around swing pin 90 about a washer 95 secured slightly above a lower end 90$a$ of swing pin 90, whereby during rotation of roller 91, the latter is in frictional contact with swinging member 89 through friction plate 94. As shown in FIG. 9, the lower end 90$a$ of pin or shaft 90 below washer 95 is inserted into a hole 98 forming a stop by which swinging or orbital movement of pin 90 is limited by opposite ends 98$a$ and 98$b$ of hole 98, as shown in FIGS. 10A and 10B.

As previously described, idler wheel 49 of pulling drive lever or actuating member 35 engages with first cam groove 48 formed in the upper surface of changing roller 47, as shown in FIGS. 9–11D, with first grooved cam 48 being defined by closed inner and outer ends 48$a$ and 48$b$. Referring to FIGS. 9, 12, and 14A–14D, a second cam groove 100 of a substantially spiral shape is formed in the lower surface of changing roller 47, with second cam groove 100 also being defined by closed outer and inner ends 100$a$ and 100$b$. An actuating or control member 101 is pivotally mounted on the lower surface of chassis 3 about a pivot pin 102, control member 101 having a substantially L-shaped configuration with one end 101$a$ thereof having an idler wheel 103 rotatably mounted thereon and which projects upwardly through an arcuate hole or slot 104 formed in chassis 3 so as to engage with second cam groove 100 of changing roller 47.

Figure 13A:
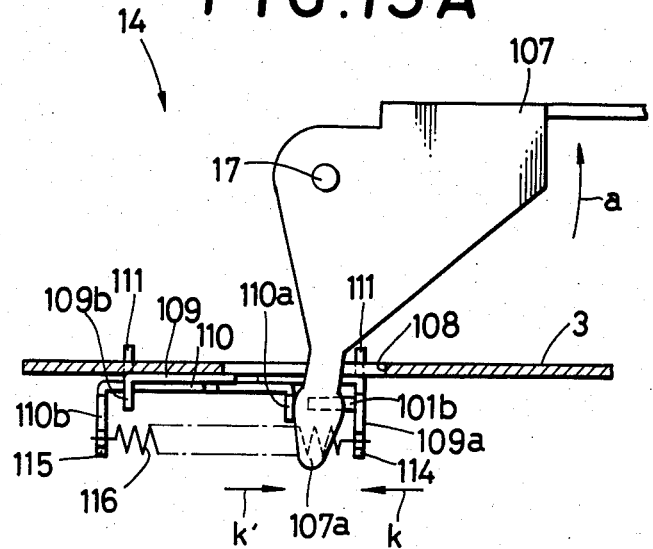
FIG. 13A is a schematic elevational view of the sliding members and elevating drive lever of the operation changing mechanism of FIG. 9, illustrated in the tape ejecting position.
Figure 13B:
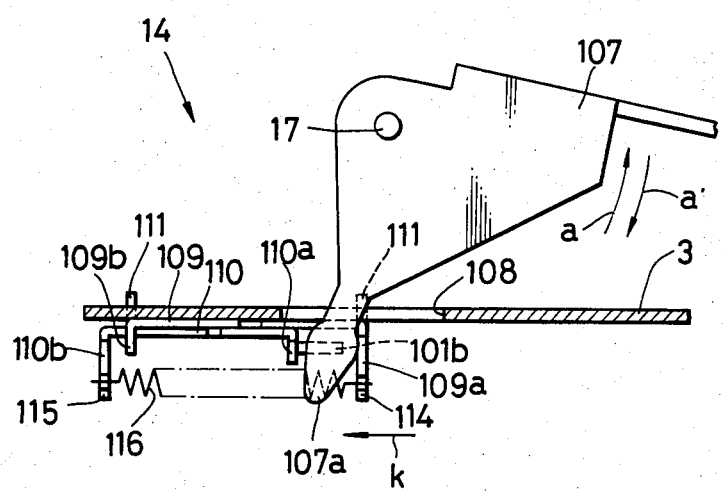
FIG. 13B is a schematic elevational view of the sliding members and elevating drive lever of the operation changing mechanism of FIG. 9, illustrated in the tape loading position.

An elevating drive lever 107 is formed integrally at one side of elevating drive plate 15 and includes a distal end 107a which projects downwardly through an elongated hole 108 formed in chassis 3, as shown in FIGS. 12, 13A and 13B. First and second sliding members 109 and 110 are slidably mounted below chassis 3 to one side of control member 101, each sliding member having a substantially U-shaped configuration. A pair of T-shaped projections 111 project upwardly from opposite ends 109a and 109b of first sliding member 109 and are slidably engaged in a pair of elongated T-shaped holes 112 formed in chassis 3, whereby first sliding member 109 is mounted on chassis 3. Second sliding member 110 is positioned beneath first sliding member 109 and engages with a guide groove 113 formed in first sliding member 109, so that second sliding member 110 is slidable in the same direction as first sliding member 109 and with respect to the latter. A tension spring 116 is hooked between projections 114 and 115 and formed integrally with one end 109a of first sliding member 109 and the opposite end 110b of second sliding member 110. The other end of leg 101b of control member 101 and the distal end 107a of elevating drive lever 107 are inserted between end 109a of first sliding member 109 and end 110a of second sliding member 110.

Figure 10A:
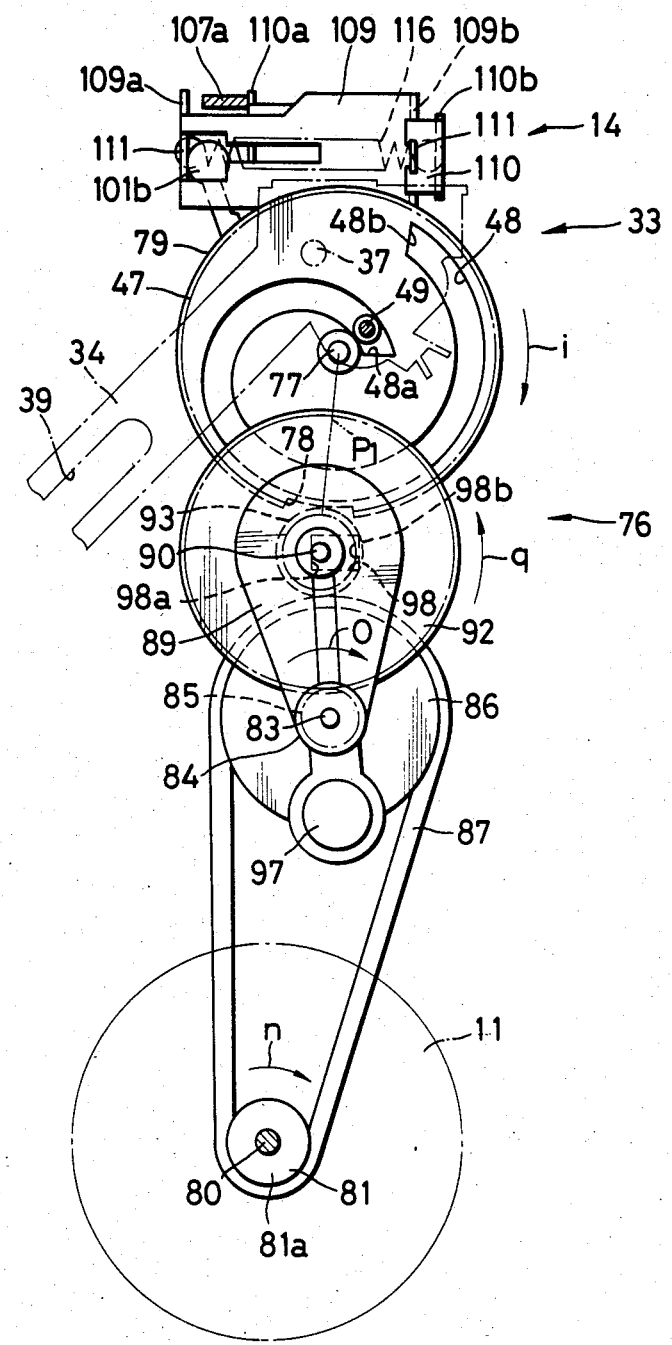
FIG. 10A is a schematic top plan view of a portion of the operation changing mechanism of FIG. 9, illustrated in an ejection completion position.
Figure 10B:
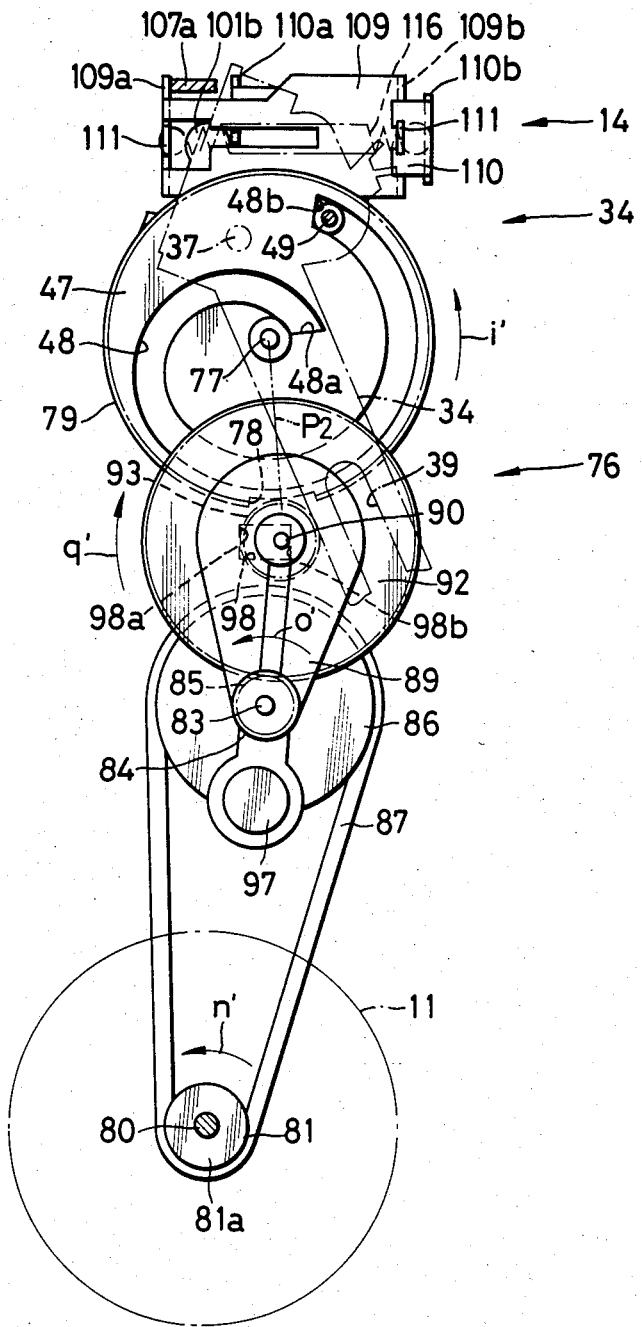
FIG. 10B is a schematic top plan view of a portion of the operation changing mechanism of FIG. 9, illustrated in a loading completion position.

FIG. 10A shows the state of operation after ejection of tape cassette 1. In this state, changing roller or rotary cam member 47 is locked at a first or ejection completion position $P_1$ as will be described in greater detail hereinafter. When the loading operation of tape cassette 1 is initiated, changing roller 47 is rotated in the direction indicated by arrow $i$ in FIG. 10A through an angle of less than 360°, starting and ending at toothless portion or gap 78, and is moved to a second or loading completion position $P_2$ shown in FIG. 10B. In the former state, as shown in FIGS. 11A and 14A, second swinging gear 93 of roller 91 is located at the center of toothless portion 78, and the axis of gear 93 is at a first position in which swing pin 90 abuts against one end 98a of swinging regulation hole 98.

Figure 14A:
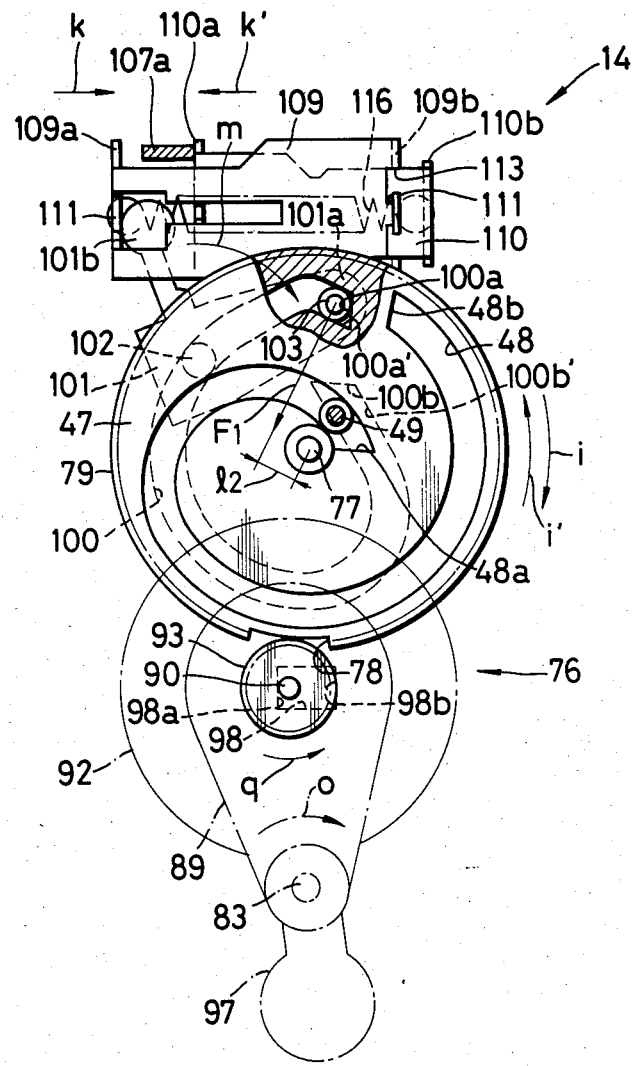
FIG. 14A is a schematic top plan view of a portion of the operation changing mechanism of FIG. 9, illustrated in the ejection completion position.

In addition, as shown in FIGS. 13A and 14A, sliding members 109 and 110 are biased by tension spring 116 in the directions indicated by arrows $k$ and $k'$, respectively. When first sliding member 109 is slid in the direction indicated by arrow $k$, end 109a thereof presses against the other end 101b of actuating or control member 101 which is then pivoted in the direction indicated by arrow $m$ shown in FIG. 14A. Idler wheel 103 at end 101a of control member 101, at such time, is located at closed end 100a of second cam groove 100, as shown in FIG. 14A, and is urged against a side surface 100a' of closed end 100a of second cam groove 100 by a force $F_1$ resulting from the biasing force of spring 116 acting in the direction indicated by arrow $m$. Thus, force $F_1$ acts at a position which is deviated to the left by a predetermined distance $l_2$ in FIG. 14A from the center of changing roller 47. As a result, the rotational moment given by $F_1 \times l_2$ pivots changing roller 47 in the direction indicated by arrow $i'$ in FIG. 14A. However, since closed end 100a of second cam groove 100 abuts against idler wheel 103, changing roller 47 is locked at the position shown in FIG. 14A, that is, at the first or ejection completion position $P_1$ described above.

As shown in FIG. 13A, by means of the biasing force of spring 116 acting to slide second sliding member 110 in the direction indicated by arrow $k'$, distal end 107a of elevating drive lever 107 is pushed by end 110a of second sliding member 110 and thereby pivoted in the direction indicated by arrow $a$ in FIG. 13A, whereby cassette holder 2 is elevated to the cassette ejecting position shown in FIG. 2A.

Figure 14B:
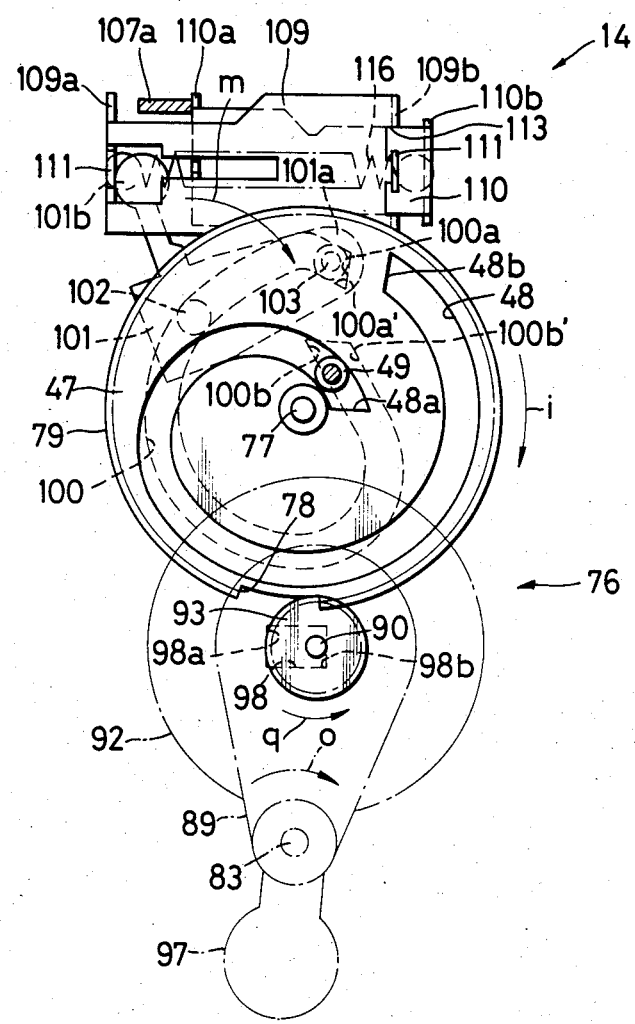
FIG. 14B is a schematic top plan view of the poriton of the operation changing mechanism of FIG. 14A, illustrated in an intermediate tape loading position.

When cassette detection switch 43 is subsequently turned ON, motor 11 is driven in the clockwise direction indicated by arrow $n$ in FIG. 10A, and driving roller 84 and gear 83 are thereby rotated in the direction indicated by arrow $o$ in FIG. 10A by motor shaft 80 through belt 87. Roller 19 is then rotated in the direction indicated by arrow $q$ in FIG. 10A by driving gear 85 of driving roller 84 through upper swinging gear 92, and by the friction of friction plate 94 interposed between roller 91 and swinging mounting member 89, the latter swinging member 89 is caused to rotate about intermediate shaft 83 in the direction indicated by arrow $o$ in FIG. 10A in reaction to the force exerted by driving gear 95. Since lower swinging gear 93 of roller 91 meshes with peripheral gear teeth 79 of changing roller 47, as shown in FIGS. 11B and 14B, lower swinging gear 93 effectively causes rotation of changing roller 47 through gear teeth 79 in the direction indicated by arrow $i$ in FIGS. 11B and 14B. At this time, lower end 90a of swing shaft 90 abuts against the other end 98b of swinging regulation or stop hole 98, so that the range of swinging movement of swinging member 89 in the direction indicated by arrow $o$ is limited. When changing roller 47 is rotated in the direction indicated by arrow $i$, idler wheel 49 is guided by first cam groove 48, and pulling drive lever or actuating member 35 is thereby rotated in the direction indicated by arrow $d$ in FIG. 11B. Pulling operation lever 34 is also driven in the same direction, so that tape cassette 1 is automatically pulled.

Figure 11C:
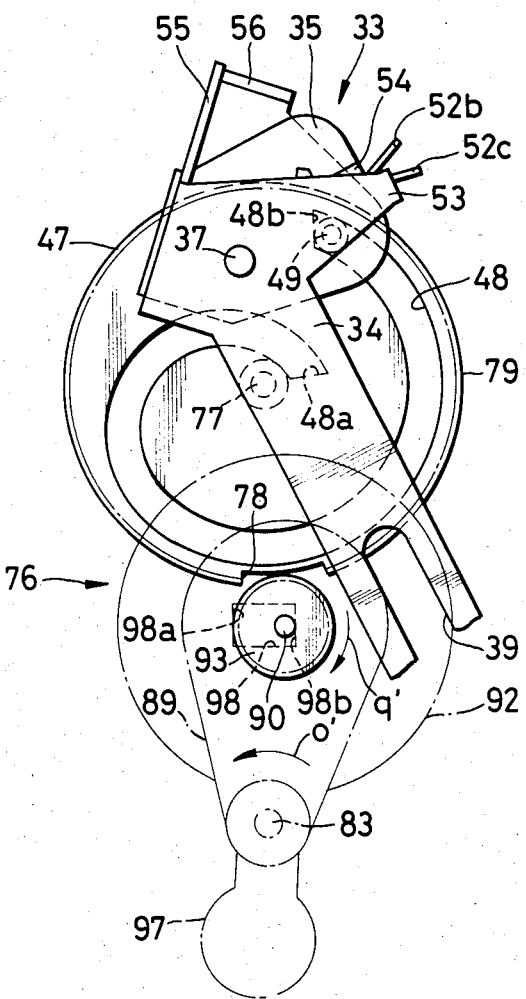
FIG. 11C is a schematic top plan view of the pulling operation lever and pulling drive lever of FIG. 9, illustrated in the tape loading position.
Figure 11D:
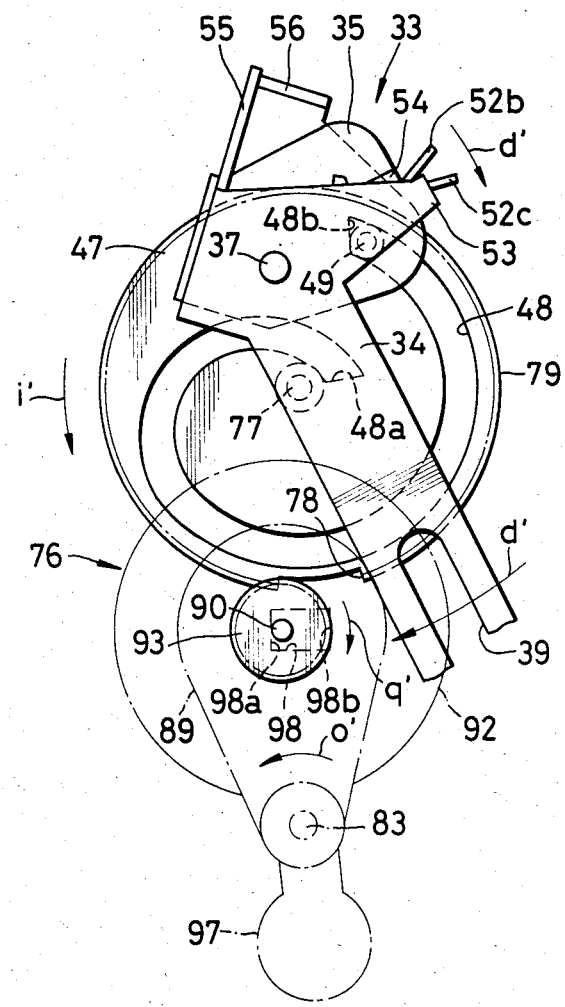
FIG. 11D is a schematic top plan view of the pulling operation lever and pulling drive lever of FIG. 9, used to illustrated a reverse operation.

Meanwhile, when pulling operation lever 34 is rotated in the direction indicated by arrow $d$ in FIG. 11B, idler wheel 103 also moves within second cam groove 100. However, control or actuating member 101 is not pivoted until pulling operation lever 34 reaches the active position shown in FIG. 11C. In other words, when changing roller 47 rotates about one-half of its full rotation angle, pulling operation lever 34 reaches the active position shown in FIG. 11C. By subsequent rotation of changing roller 47 in the direction indicated by arrow $i$, idler wheel 103 is then guided by second grooved cam 100, so that control member 101 is pivoted in the direction indicated by arrow $m$ in FIG. 14B. Although idler wheel 49 is guided in first cam groove 48, upon the latter half of rotation of changing roller 47, the distance to pivot pin 77 in the cam groove does not change. Therefore, the pivoting force does not act on pulling drive lever 35, whereby pulling operation lever 34 is held at the active position shown in FIG. 11C.

Figure 14C:
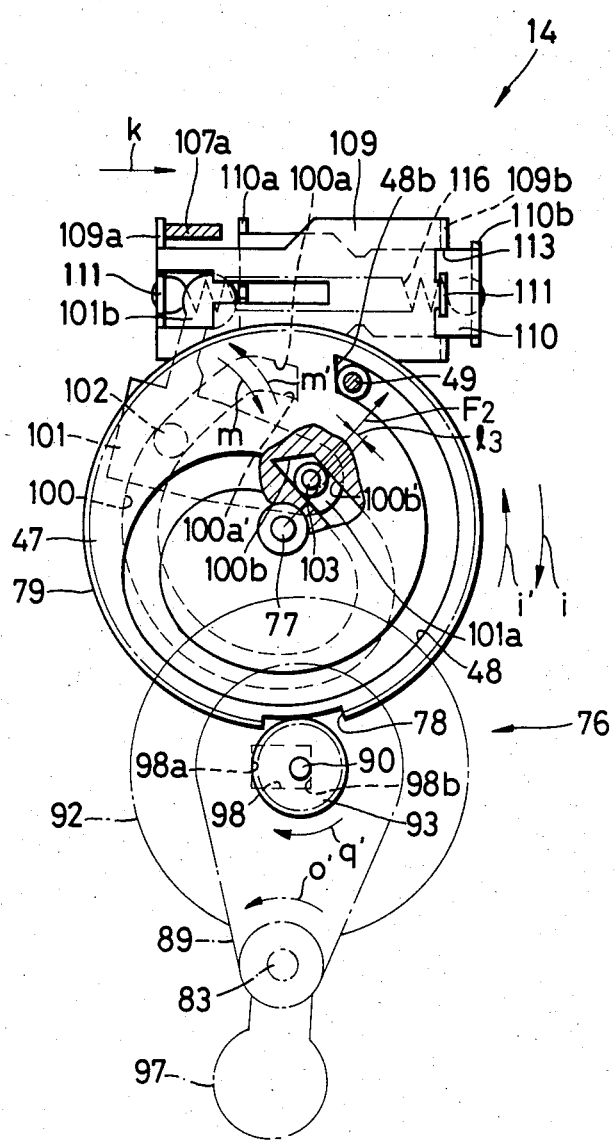
FIG. 14C is a schematic top plan view of the portion of the operation changing mechanism of FIG. 14A, illustrated in the tape loading position.
Figure 14D:
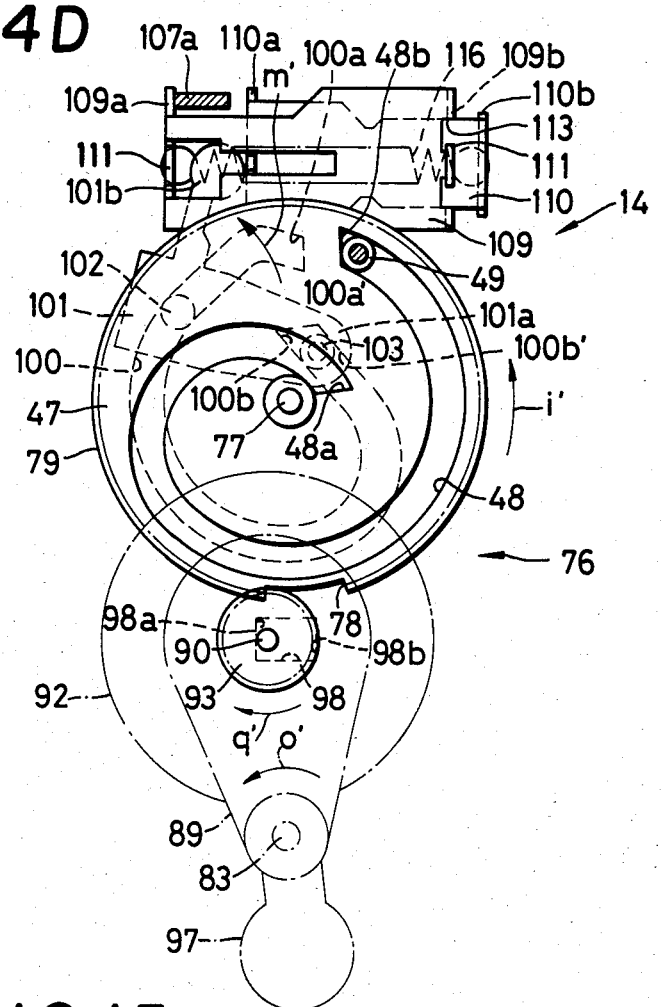
FIG. 14D is a schematic top plan view of the portion of the operation changing mechanism of FIG. 14A, used to illustrate a reverse operation.

When control member 101 is rotated in the direction indicated by the arrow $m$ shown in FIG. 14B, end 101b thereof abuts against end 110a of second sliding member 110 so as to cause the latter to slide in the direction indicated by arrow $k$ in FIGS. 13B and 14C. Then, spring 116 is pulled in the direction indicated by arrow $k$ by the other end 110b of second sliding member 110, and first sliding member 109 is slid in the direction indicated by arrow $k$ in FIGS. 13B and 14C. As a result, distal end 107a of elevating drive lever 107 is biased in the direction indicated by arrow $k$ by end 109a of first sliding member 109 which is biased by spring 116, so that elevating drive lever 107 is pivoted in the direction indicated by arrow $a'$ in FIG. 13B. In this manner, cassette holder 2 integrally secured to lever 107 is lowered to the cassette loading position.

When rotation of changing roller 47 through a predetermined angle in the direction indicated by arrow $i$ is completed, changing roller 47 reaches the second or loading completion position $P_2$ shown in FIGS. 10B, 11C and 14C, whereupon peripheral gear teeth 79 thereof are disengaged from lower swinging gear 93 of roller 91, that is, lower gear 93 is accommodated in toothless gap 78, and changing roller 47 is automatically stopped at the disengaged position. When changing roller 47 reaches the loading completion position $P_2$, it is locked at this position by the pivoting force of control member 101, as shown in FIG. 14C. In other words, control member 101 normally has a pivoting force acting thereon in the direction indicated by arow $m'$ which is provided by the pulling force of spring 116 acting in the direction indicated by arrow $k$. As a result, idler wheel 103 is urged against a side surface $100b'$ of closed end $100b$ of second cam groove 100 by a force $F_2$ which is obtained by the pivoting force of idler wheel 103 acting in the direction indicated by arrow m'. At this time, force $F_2$ acts at a higher position which is eccentric from the center of changing roller 47 by a predetermined distance $l_3$, as shown in FIG. 14C. Thus, the rotational moment given by $F_2 \times l_3$ acts on changing roller 47 which is then caused to rotate in the direction indicated by arrow $i$ shown in FIG. 14C. However, changing roller 47 at this time abuts against idler wheel 49 at closed end $48b$ of first cam groove 48 in the direction indicated by arrow $i$, and is thereby locked in the loading completion position $P_2$ shown in FIG. 14C. At this time, closed end $100b$ of second groove cam 100 abuts against idler wheel 103 to additionally lock changing roller 47. However, since idler wheel 49 is radially spaced a greater distance from the center of changing roller 47 than that of idler wheel 103, the changing roller 47 is more securely locked by idler wheel 49.

During the ejection operation of tape cassette 1 as described above, motor 11 is driven in the reverse direction which is indicated by arrow $n'$ shown in FIG. 10B. Then, according to a reverse operation to that described above, lower swinging gear 93 of roller 91 is rotated in the direction indicated by arrow $q'$ in FIGS. 11D and 14D while being swung in the direction indicated by arrow $o'$. Lower gear 93 thereby re-engages with peripheral gear teeth 79 of changing roller 47, and drives the latter in the direction indicated by arrow $i'$ in FIGS. 11D and 14D. As a result, elevating drive lever 107 is pivoted in the direction indicated by arrow $a$ shown in FIG. 13B through a reverse operation of the various elements, and cassette holder 2 is returned to the cassette ejecting position. Subsequently, pulling drive lever 35 and pulling operation lever 34 are driven in the direction indicated by arrow $d'$ in FIG. 11D and automatic ejection of the tape cassette is performed in the manner described above.

Operation changing mechanism 76 as described above includes driving roller 84 having driving gear 85 which is driven in the forward or reverse direction by motor 11, roller 91 which is swung in accordance with the rotating direction of driving roller 84 and has swinging gear 93 formed thereon, swinging limiting or stop hole 98 as a means for regulating the range of swinging movement of roller 91, changing roller or rotary cam member 47 as a changing gear which has first and second cam groove 48 and 100 formed thereon, along with peripheral gear teeth 79 selectively meshable with gear 93, and locking means, that is, idler wheel 103 and second cam groove 100, for locking changing roller 47 at the ejection completion position $P_1$ and the loading completion position $P_2$. Roller 91 is swung by the clockwise or counter-clockwise rotation of driving roller 84, so that gear 93 of roller 91 selectively meshes with changing gear 79 of changing roller 47, whereby to selectively rotate changing roller 47 in the clockwise or counter-clockwise direction. In this manner, pulling drive lever 35 and elevating drive lever 107 are driven by first and second grooved cams 48 and 100. Accordingly, without an auxiliary device for triggering changing gear 79, clockwise and counter-clockwise rotation of motor 11 along produces selective rotation of changing gear 79, and accordingly, a predetermined changing operation. Thus, the overall mechanism has a relatively simple, but novel, structure, which can be manufactured at low cost. When motor 11 is driven in the clockwise or counter-clockwise direction, gear 93 of roller 91 securely meshes with changing gear 79 of changing roller 47, so that changing roller 47 is reliably driven and the changing operation is reliably performed.

Operation changing mechanism 76 also includes second cam groove 100 with two closed ends, as previously discussed. Thus, upon rotation of changing roller 47 through a predetermined angle by means of roller 91 as a drive source, control member 101 is displaced by rotation of changing roller 47 upon engagement with second grooved cam 100 through idler wheel 103, and elevating drive lever 107, which is an operative member, is interlocked with the displacement of control member 101. When elevating drive lever 107 is at the operative position shown in either FIG. 13A or FIG. 13B, the force of spring 116 acts on idler wheel 103 through control member 101, so that idler wheel 103 is urged against side surfaces $100a'$ and $100b'$ of closed ends $100a$ and $100b$, respectively, of second grooved cam 100. Accordingly, changing roller 47 is rotated in the direction indicated by arrow $i$ shown in FIG. 14A or in the direction indicated by arrow $i'$ shown in FIG. 14D, so that idler wheel 103 abuts against closed ends $100a$ and $100b$ of second grooved cam 100, whereby changing roller 47 is locked in position. Therefore, it is unnecessary to provide an additional or auxiliary locking device for locking changing roller 47 at a predetermined position, resulting in a relatively simple mechanism which is relatively inexpensive to manufacture.

When operation changing mechanism 76, as described above, is applied to a loading mechanism of a tape cassette 1, the automatic loading operation consisting of the automatic pulling operation of tape cassette 1 in cassette holder 2 and of the subsequent lowering operation of cassette holder 2, in addition to the ejection operation performed in reverse, is performed smoothly by the clockwise or counter-clockwise rotation of motor 11 and the cam operation of changing roller 47. Accordingly, no unpleasant impact sound during loading or ejection of tape cassette 1 is produced. Thus, the mechanism according to the present invention provides for soft loading or ejection of the tape cassette, with a relatively simple and inexpensive structure.

It is to be appreciated that, since the clockwise or counter-clockwise rotation of motor 11 may be controlled by the ON/OFF control of cassette detection switch 43, and since the clockwise or counter-clockwise driving of motor 11 alone achieves the soft loading or ejection of the tape cassette, the user in an automobile can, for example, perform a soft loading or ejection operation by remote control from the rear seat of the automobile. Furthermore, the soft loading or ejection operation is performed by motor 11 which also drives capstans 4 and 5, so that a separate motor and/or an electromagnetic mechanism need not be provided. A low-cost loading mechanism is thus provided.

Figure 15:
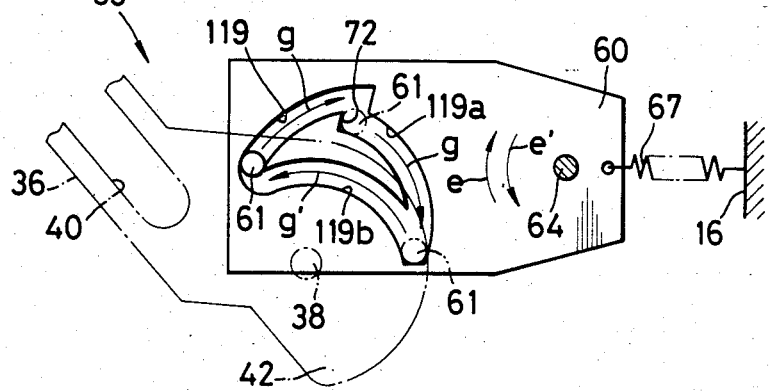
FIG. 15 is a top plan view of a modification of the locking plate of the operation changing mechanism of FIG. 9.

Referring now to FIG. 15, there is shown a modification of locking plate 60 with respect to switch operation lever 36. In this case, an idler pin 61 is guided by an endless guide groove 119 in locking plate 60, which has a guide path 119a toward the active position and a guide path 119b toward the inactive position, with an engaging portion 72 being arranged in guide path 119a. When idler pin 61 is moved in the direction indicated by arrow g from the inactive position shown in FIG. 7A, locking plate 60 is pivoted about a pivot pin 64 in the direction indicated by arrow e' against the biasing force of a return spring 67, while idler pin 61 is guide along guide path 119a. During movement of the idler pin 61 toward the active position, the latter is locked by engaging portion 72. When idler pin 61 is moved from the active position shown in FIG. 7C in the direction indicated by arrow g', locking plate 60 is pivoted in the direction indicated by arrow e while idler pin 61 is guided along the guide path 119b. In this case, locking plate 60 need not be swung vertically and need only be swung within a horizontal plane.

It is to be appreciated that various modifications of the present invention can readily be made by one of ordinary skill in the art. For example, it is possible to directly interconnect driving roller 84 and roller 91 so that roller 91 may be rotated in accordance with the rotating direction of driving roller 84. Further, the present invention is not limited to a loading mechanism for a tape cassette, but may, for example, be applied to other types of mode changing mechanisms, such as a reciprocal driving mechanism for a tone arm of a record player.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An operation changing mechanism for an electronic apparatus, comprising:
   a rotatable driving gear;
   means including an electric motor for selectively rotating said driving gear in opposed first and second directions;
   a first swinging gear in meshing engagement with said driving gear for rotation by the latter and a second swinging gear coaxial with said first swinging gear and rotatably coupled with the latter;
   mounting means rotatable supporting said first and second swinging gears and being swingable about the axis of said driving gear for orbital movements of the common axis of said first and second swinging gears about said driving gear while maintaining said meshing engagement between the latter and said first swinging gear;
   stop means for limiting said orbital movements in opposite directions at first and second positions of said common axis and to which the latter is urged in reaction to rotation of said driving gear in said first and second directions, respectively, while in said meshing engagement with said first swinging gear;
   a rotary cam member having peripheral gear teeth engageable by said second swinging gear from turning of said rotary cam member between first and second rotary positions said peripheral gear teeth having a toothless gap with a peripheral dimension to accommodate said second swinging gear and thereby halt turning of said rotary cam member in said first and second positions when said common axis of the swinging gears is in said first and second positions, respectively thereof, the extent of said orbital movements between said first and second positions of the common axis being related to said peripheral dimension of the toothless gap so that with said common axis in one of said first and second positions thereof and said second swinging gear accommodated in said toothless gap of the rotary cam member in one of said first and second positions of the latter, the orbital movement of said common axis to the other of said first and second positions engages said second swinging gear with said peripheral gear teeth for turning said rotary cam member in a respective direction to the other of said first and second positions of the latter, said rotary cam member further having at least one cam surface thereon;
   an actuating member engaging said cam surface and being reciprocally moved thereby in response to turning of said rotary cam member between said first and second positions of the latter for changing a respective operation of an electronic apparatus; and
   locking means for selectively locking said rotary cam member at said first and second positions thereof and thereby preventing inadvertent turning of said rotary cam member.

2. An operation changing mechanism according to claim 1; in which said rotary cam member has a spiral cam groove defining said cam surface, and said actuating member has a cam follower pin engaging in said cam groove; and in which said locking means holds said rotary cam member against turning when said cam follower pin engages either of the end portions of said cam groove.

3. An operation changing mechanism according to claim 2; in which said end portions of the cam groove have respective closed ends surfaces; and in which said locking means include biasing means acting on said actuating member to urge said pin against side surface portions of said cam groove when said rotary cam member is near said first and second positions, respectively, thereof, and said side surface portions of the cam groove are disposed so that, when said pin engages one of said side surface portions, a force of said biasing means applied through said actuating member and pin, produces a rotational moment urging said rotary cam member to turn in the direction holding one of said closed end surfaces against said pin.

* * * * *